US 8,630,256 B2
Jan. 14, 2014

(12) United States Patent
Tinnakornsrisuphap et al.

(10) Patent No.: US 8,630,256 B2
(45) Date of Patent: Jan. 14, 2014

(54) METHOD AND SYSTEM FOR REDUCING BACKHAUL UTILIZATION DURING BASE STATION HANDOFF IN WIRELESS NETWORKS

(75) Inventors: Peerapol Tinnakornsrisuphap, San Diego, CA (US); Jun Wang, La Jolla, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1065 days.

(21) Appl. No.: 11/950,247

(22) Filed: Dec. 4, 2007

(65) Prior Publication Data

US 2008/0186918 A1 Aug. 7, 2008

Related U.S. Application Data

(60) Provisional application No. 60/868,711, filed on Dec. 5, 2006.

(51) Int. Cl.
*H04W 4/00* (2009.01)

(52) U.S. Cl.
USPC .......................... 370/331; 370/330; 370/332

(58) Field of Classification Search
USPC ........................................................ 370/331
See application file for complete search history.

(56) References Cited

U.S. PATENT DOCUMENTS

| 6,052,598 | A | 4/2000 | Rudrapatna et al. |
| 7,082,143 | B1 | 7/2006 | LeBlanc et al. |
| 2004/0106407 | A1* | 6/2004 | Kikuma et al. ............... 455/436 |
| 2004/0218617 | A1 | 11/2004 | Sagfors |
| 2005/0200891 | A1 | 9/2005 | Cohen |
| 2006/0045011 | A1* | 3/2006 | Aghvami et al. ............. 370/230 |
| 2007/0025480 | A1* | 2/2007 | Tackin et al. ................. 375/345 |

FOREIGN PATENT DOCUMENTS

| CN | 1518283 | A | 8/2004 |
| EP | 1018849 | A2 | 7/2000 |
| GB | 2372172 | | 8/2002 |
| GB | 2399989 | | 9/2004 |
| WO | WO2006086786 | A1 | 8/2006 |

OTHER PUBLICATIONS

International Search Report—PCT/US2007/086484, International Search Authority—European Patent Office—Jul. 18, 2008.
Written Opinion—PCT/US2007/086484, International Search Authroity—European Patent Office—Jul. 18, 2008.

(Continued)

*Primary Examiner* — Shripal Khajuria
(74) *Attorney, Agent, or Firm* — Darren M. Simon

(57) ABSTRACT

Systems and methods are provided that facilitate active queue management of internet-protocol data packets generated in a data packet switched wireless network. Queue management can be effected in a serving base station as well as in an access terminal, and the application that generates the data packets can be executed locally or remotely to either the base station or access terminal. Management of the generated data packets is effected via a marking/dropping of data packets according to an adaptive response function that can be deterministic or stochastic, and can depend of multiple communication generalized indicators, which include packet queue size, queue delay, channel conditions, frequency reuse, operation bandwidth, and bandwidth-delay product. Historical data related to the communication generalized indicators can be employed to determine response functions via thresholds and rates for marking/dropping data packets.

19 Claims, 16 Drawing Sheets

(56) References Cited

OTHER PUBLICATIONS

Dorot V. at al, Explanatory Dictionary on Modern Computer Vocabulary (2nd edition), BHV—Petersburg, Saint-Petersburg, 2001,—L1—p. 339.

Dorot, V., et al., "An Explanatory Dictionary of Modern Computer Terms," 2nd Edition, BHV-Petersburg Publishers, Saint Petersburg, 2001, 'Program Product' on p. 339.

Taiwan Search Report—TW096146383—TIPO—Dec. 11, 2011.

\* cited by examiner

METHOD AND SYSTEM FOR REDUCING BACKHAUL UTILIZATION DURING BASE STATION HANDOFF IN WIRELESS NETWORKS

CLAIM OF PRIORITY UNDER 35 U.S.C. §119

This application for patent claims the benefit of U.S. Provisional Application Ser. No. 60/868,711 filed on Dec. 5, 2006, and entitled "METHOD AND SYSTEM FOR REDUCING BACKHAUL UTILIZATION DIRING BASE STATION HANDOFF IN WIRELESS NETWORKS." The entirety of this application is expressly incorporated herein by reference.

BACKGROUND

1. Field

The subject disclosure relates generally to wireless communication and more particularly to base station handoff in wireless communication systems.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, each subcarrier can comprise a portion of sequential time slices or time slots. Each user may be provided with one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

Independently of the technique employed to accomplish a wireless communication, in certain wireless networks the amount of data that needs to be transferred between base stations during a handoff event may be large due to a large amount of data buffered at a base station when handoff is necessary. One important cause is the absence of tight flow control between the access gateway and the base station. Such a substantial data transfer can significantly increase bandwidth requirement at a base station. Proprietary solutions are expensive and hardly transferable. Therefore there is a need in the art for systems and methods that facilitate effective base station handoff in a wireless communication network.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, the subject description discloses a wireless communication device comprising: a processor configured to receive a set of internet-protocol (IP) data packets generated by a computer-implemented application, wherein the computer implemented application executes remotely; to assign a data packet queue to the received set of IP data packets; to mark or drop a subset of the IP data packets in the received set of IP data packets based at least in part on an adaptive communication generalized indicator; to convey a complementary set of IP data packets associated with the application and extant in the data packet application queue; and a memory coupled to the at least one processor.

In another aspect, a method employed in a wireless communication environment is described, the method comprising: receiving an internet-protocol (IP) data packet associated with a computer-implemented application; buffering the IP data packet; marking or dropping the IP data packet based at least in part on an adaptive response function, wherein the response function depends on a set of communication generalized indicators; and conveying a marked IP data packet.

In yet another aspect, the subject specification describes a computer program product comprising a computer-readable medium including: code for causing at least one computer to receive an internet-protocol (IP) data packet associated with a computer implemented application; code for causing at least one computer to buffer the IP data packet; code for causing at least one computer to mark or drop the IP data packet based at least in part on an adaptive response function; and code for causing at least one computer to convey a marked IP data packet.

In a yet further aspect, an apparatus that operates in a wireless system is disclosed, the apparatus comprising: means for receiving a set of internet-protocol (IP) data packets associated with a computer-implemented application executing remotely; means for assigning a data packet queue to the received set of IP data packets; means for marking or dropping a subset of the IP data packets in the received set of IP data packets based at least in part on an adaptive communication generalized indicator and an associated threshold thereof, means for receiving the adaptive communication generalized indicator and the associated threshold thereof, and means for conveying a complementary set of IP data packets associated with the application and extant in the data packet application queue.

In another aspect, the subject specification describes a wireless communication device comprising: a processor configured to receive an internet-protocol (IP) data packet generated by a computer-implemented application, wherein the computer implemented application executes remotely; to mark the received IP data packet based at least in part on a response function; to convey the received IP data packet; and to convey a marking indicator; and a memory coupled to the processor.

In yet another aspect, a method utilized in a wireless communication system is disclosed, the method comprising: receiving an internet-protocol (IP) data packet generated by a computer-implemented application, wherein the computer implemented application executes remotely; marking or dropping the received IP data packet based at least in part on a response function that depends on a communication generalized indicator; and conveying a marking indicator.

In a further aspect, an apparatus that operates in a wireless environment is described herein, the apparatus comprising: means for receiving an internet-protocol (IP) data packet generated by a computer-implemented application; means for buffering the received IP data packet; means for marking or dropping the received IP data packet according to a deterministic or stochastic response function; and means for conveying a marked IP data packet.

In a still further aspect, the subject description discloses a computer program product including a computer-readable medium comprising: code for causing at least one computer to receive an internet-protocol (IP) data packet generated by a first computer-implemented application; code for causing at least one computer to generate a set of IP data packets associated with a second computer-implemented application; code for causing at least one computer to mark or drop the received IP data packet or at least one of the generated IP data packets based at least in part on a response function that depends on a communication generalized indicator; code for causing at least one computer to convey a marking indicator; and code for causing at least one computer to convey at least one of the IP data packets in the set of generated IP data packets.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
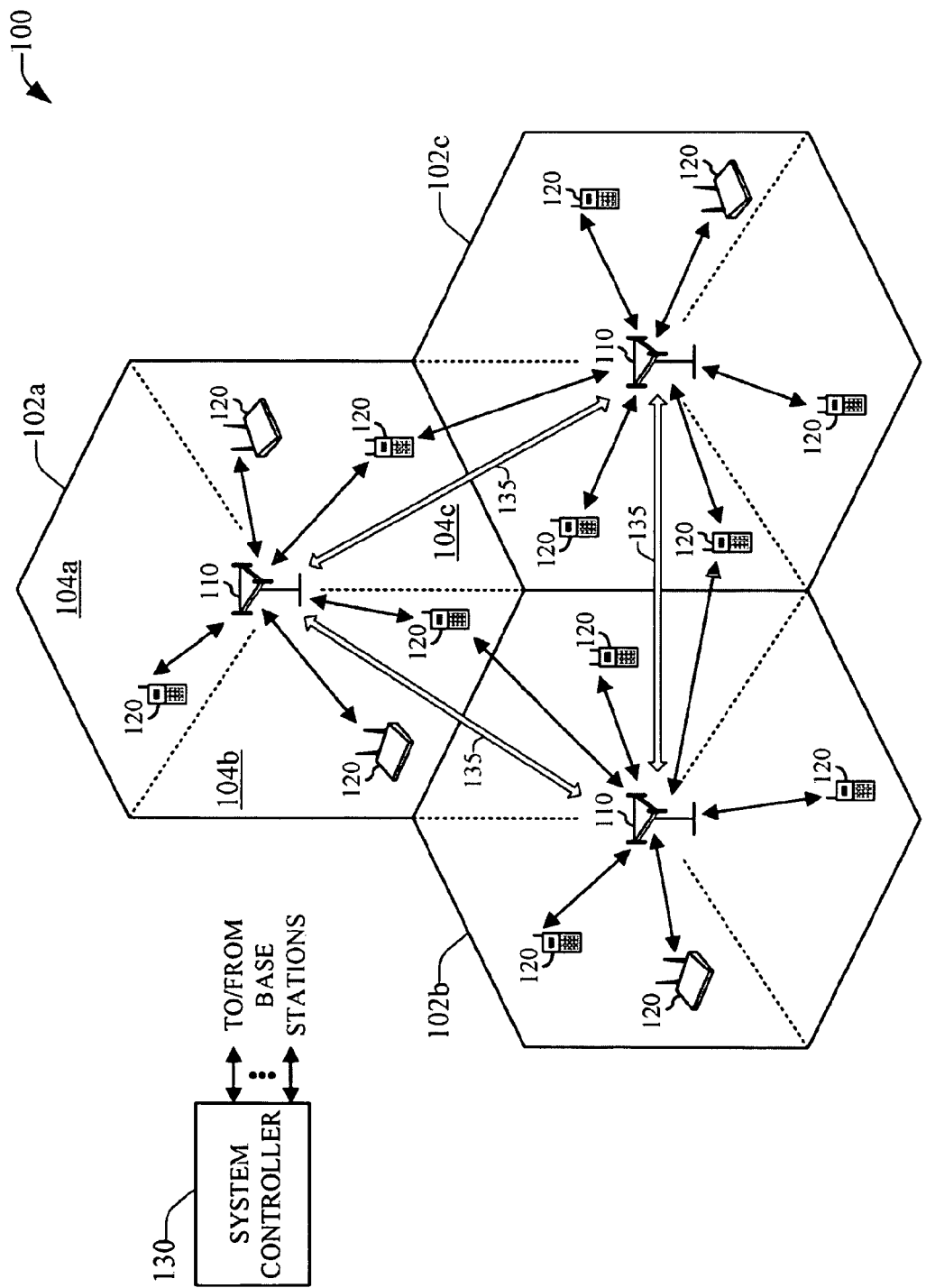
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "component," "module," "application," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, or user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point, Node B, evolved Node B (eNodeB), evolved base station (eBS), access network (AN) or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. While the following description generally relates to a system in which each terminal communicates with one serving access point for simplicity, it should be appreciated that terminals can communicate with any number of serving access points In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. Backhaul network communication 135 can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2A:
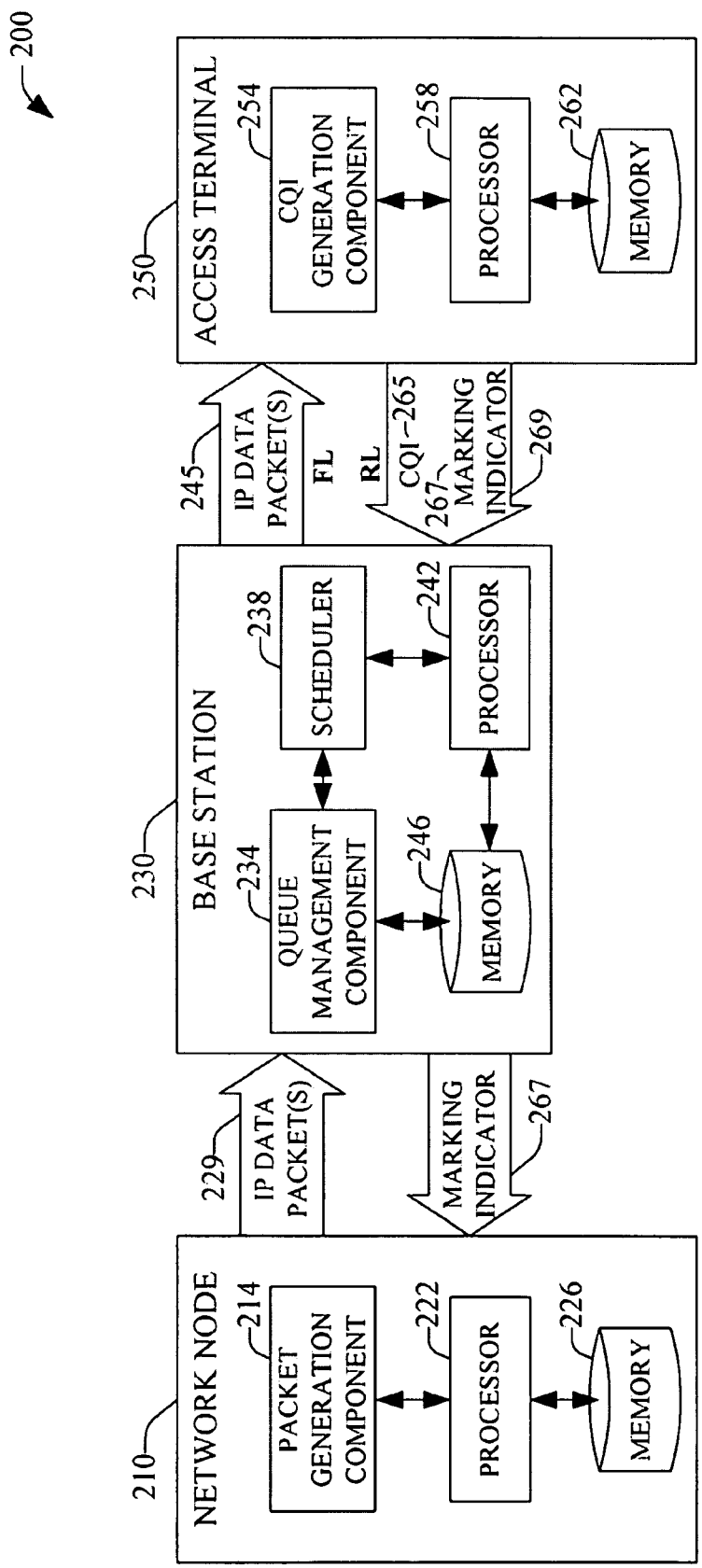
FIGS. 2A, 2B, and 2C illustrate block diagrams of example systems that facilitate queue management during communication according to aspects described herein.

FIG. 2A illustrates a block diagram of an example system 200 that facilitates queue management during communication among a base station and an access terminal in a distributed, data-packet switched wireless network. A network node 210 generates data packet(s) through a packet generation component 214 which typically conveys information generated by an application and employs an internet protocol (e.g., IPv4, IPv6, or IP mobility). A network node 210 can be a node in the internet or in substantially any IP data-switched distributed network. IP data packet(s) 229 can be conveyed via (low bandwidth) backhaul communication (e.g., link 135), typically through an access gateway (not shown), to a base station 230 which (i) manages a queue associated with the application that creates the IP data packets, (ii) routes IP data packet(s) according to said active queue management, and (iii) schedules and transmits the IP data packet(s) to an access terminal 250 over a wireless forward link 245. As a result of the active queue management, base station 230 will modify one or more bits in the header of a conveyed IP data packet. When the IP data packet(s) 229 are received in access terminal 250, as part of an application (not shown), access terminal 250 can echo the packet marking in a marking indicator 248 associated with a response IP data packet(s). Marking indicator 248 can be conveyed to the network node 210 in order to adjust a data packet generation rate in view of possible queue congestion—e.g., accumulation of IP data packet(s) in a buffer (see below). Alternatively, or in addition, as a sign of queue congestion, IP packet(s) can be dropped instead of marked; dropped packets can also result in an application reducing a packet generation rate. As a result of reducing the IP packet generation rate, the number of queued packets in base station 230 can decrease with an ensuing reduction in backhaul communication during a base station handoff.

In an aspect, when a number of marked IP data packets or a marking type changes, an application (not shown), through packet generation component 214, can also respond by reducing data transmission rate. As a result, data packet backlog at base station 230 can diminish, which in turn reduces backhaul utilization at base station 230 during handoff. A potential advantage of active queue management is simplifying interfaces between base stations and other elements in the networks, e.g., as tight flow control may not be necessary to maintain a small buffer in the base station, while still keeping the backhaul utilization low. Additionally, when a mobile terminal that is served by a first base station and receives IP data packets associated with an application is handed-off to a serving second base station, the data extant in a packet queue in the first serving base station (e.g., 230) is efficiently transmitted to the second base station via backhaul communication.

Active queue management provided by queue management component 234 can be based, at least in part, on the size of a data packet queue associated with a specific application. In addition, or alternatively, queue management component 234 can employ a channel condition (CQI) of an access terminal (e.g., access terminal 250) conveyed over reverse link 265 to actively manage a queue; for instance, when CQI degrades below a threshold, which can be determined by base station 230, before the queue becomes large to allow the applications to reduce the transmission rates. The CQI can be based at on a least one of the following channel condition metrics: a signal-to-interference ratio, a signal-to-noise ratio, a signal-to-interference-and-noise ratio, or the like.

As mentioned supra, IP data packet(s) 229 are generated trough an application, such application can refer to network functions (e.g., best-effort delivery like transmission control protocol (TCP)) located remotely from base station that provide and receive IP packets for communication with one or more terminals. The subject applications can have various latency aspects and QoS; for instance, an application can be an on-line gaming application (low-latency desired to ensure satisfactory QoS; commercially relevant application since service providers/carriers can engage users in premium service offering, increasing revenue), a voice over internet protocol (VOIP) application (appreciable latency can be tolerated by a user; however, jitter associated with poor handoff can have an adverse effect on QoS; it should be appreciated that systems and method of the subject application mitigate jitter by providing efficient handoff data transfer as discussed herein), a streaming video application (active queue management can be necessary to ensure that handoff proceeds efficiently through low data transfers), a computer operating a system application associated with an access terminal 250 (the computer can be routed through an IP core network to network node 210), a custom application that produces data conveyed through best-effort traffic for user-specific purposes, and the like). In an aspect, an application can reside in network node 210, and a processor 222 can execute at least in part the application. It should be appreciated that processor 222 can also execute other operational aspects typical of network node 210.

It should be appreciated that a degree of queue congestion, or a degree of IP data packet(s) accumulation in a buffer for example, can be affected by CQI 265, not only directly through explicit incorporation in algorithms (see below) that dictate the manner in which an IP data packet is marked or dropped but also indirectly through the rate at which an IP data packet is scheduled and communicated. In base station 230, scheduler 238 can utilize a received channel state information, or CQI 265, combined with scheduling algorithms (such as round robin, fair queuing, maximum throughput, proportional fairness, etc.) to schedule dynamically (i) communication resources like bandwidth and frequency reuse (to reduce other sector interference); (ii) an operation mode of access terminal 250, a mode of operation that can include transmission in one of single-user single-input multiple-output (SIMO), single-user multiple-input multiple output (SU- MIMO) or multi-user MIMO (MU-MIMO); and (iii) a code rate and symbol constellation size employed to transmit data, e.g., IP data packet. Therefore, when large bandwidth and frequency reuse close to unity, as well as operation in high-capacity MU-MIMO mode is allocated to access terminal 250, a queue associated with an application can be decongested, e.g., drained, more readily, thus determining the volume of data packets that are marked or dropped.

In an aspect, reported CQI 265 at access terminal 250 can be determined based at least in part on a received known pilot sequence of symbols which is transmitted by base station 230. Various sequences can be employed, for example: a constant amplitude zero autocorrelation (CAZAC) sequence, a pseudorandom code, or a pseudonoise sequence, or a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). A CQI generation component 224 receives the pilot signal, conveyed according to a specific multiple access mode of operation (e.g., CDMA, FDMA, or TDMA) and computes a channel condition metric based on said received pilot. After determination of a CQI value access terminal 250 transmits a CQI channel which reports CQI 265.

Figure 2B:
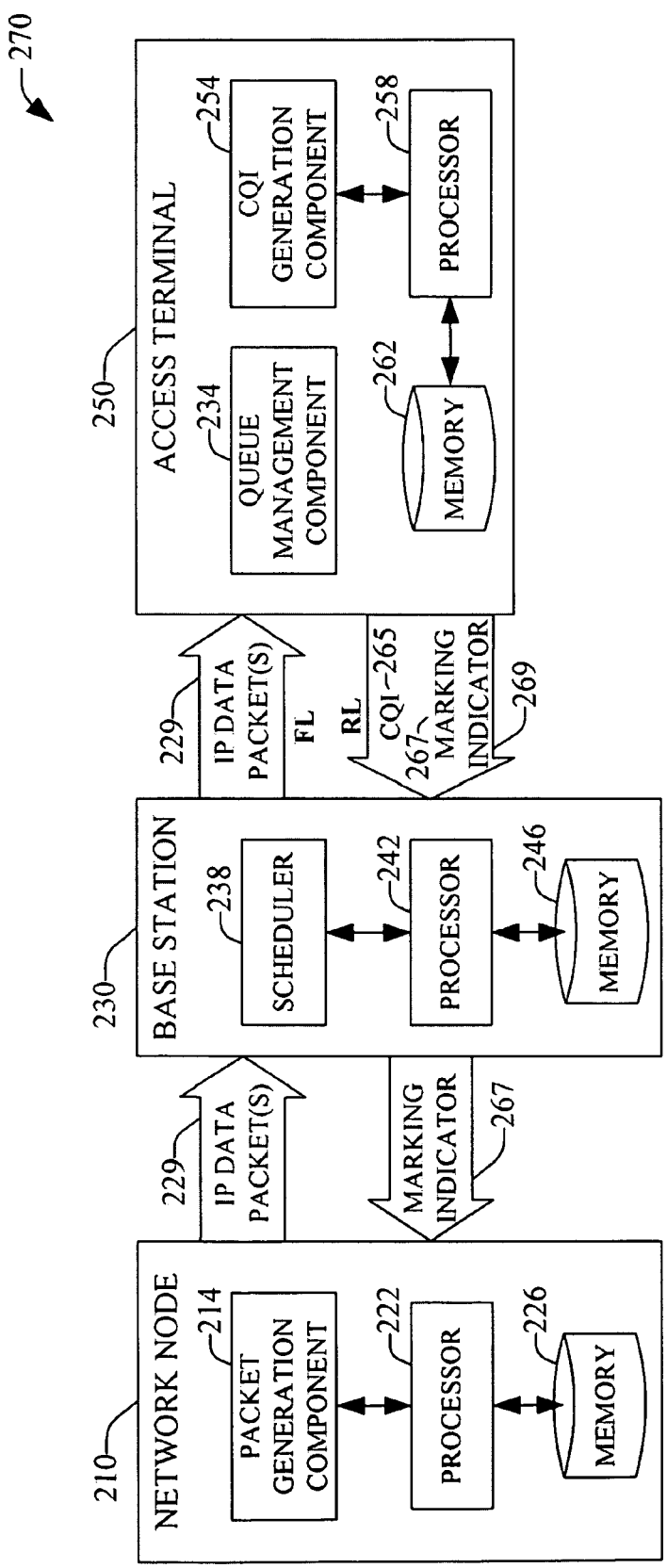

FIG. 2B illustrates a block diagram of an alternative, or additional, example embodiment 270 that facilitates queue management during communication among a base station 230 and an access terminal 250 in a distributed, data-packet switched wireless network. In example embodiment 270, components with like numerals in example system 200 have, or provide, substantially the same functionality as described in connection with components in system 200. In example system 270, IP packet management is performed in the access terminal 250, through a queue management component 234. In an aspect, base station 230 in embodiment 270 relays IP packet(s) 229 to access terminal 250, and a queue is maintained and managed at terminal 250 in substantially the same manner as described supra in connection with example system 200.

Figure 2C:
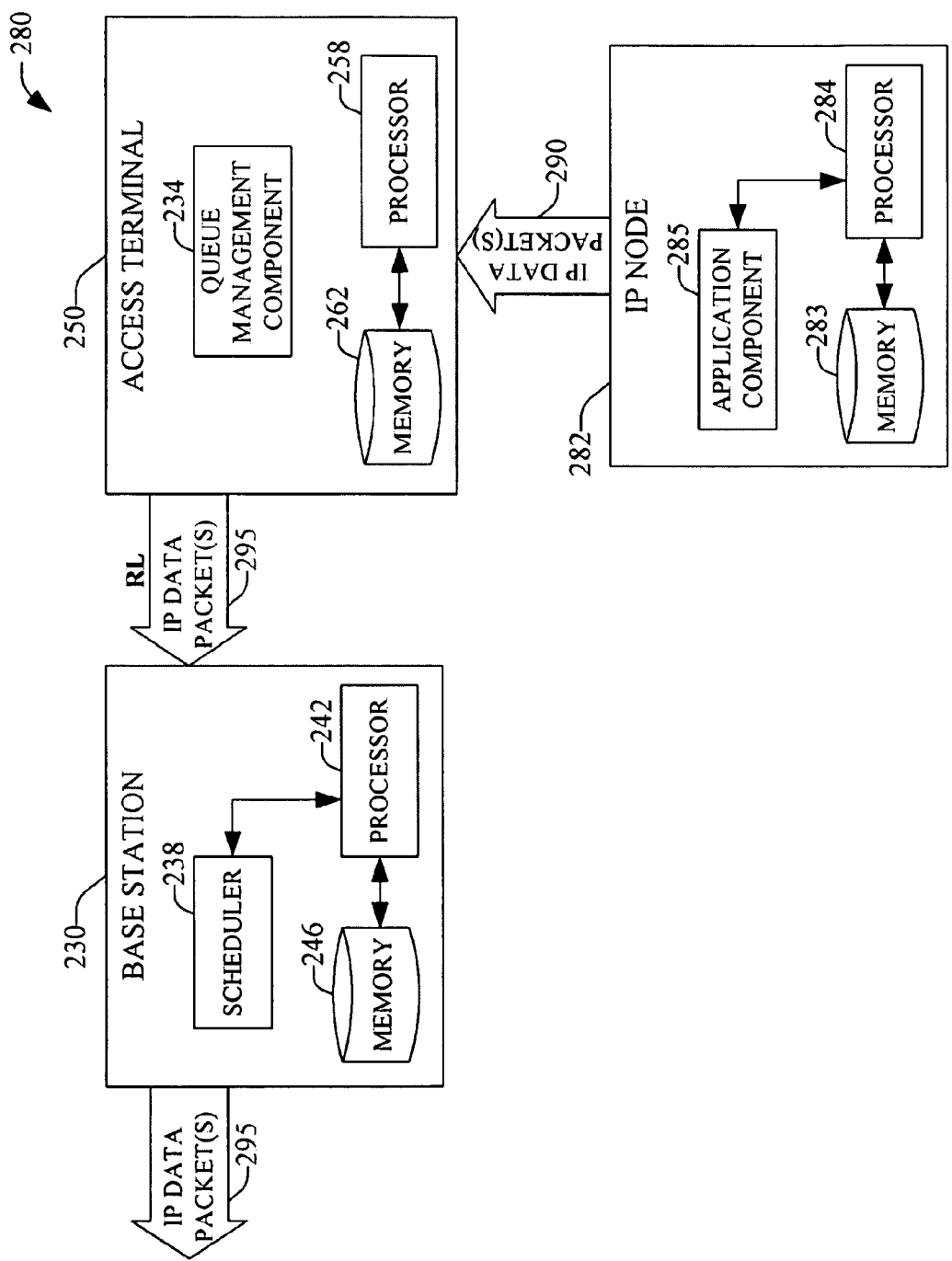

FIG. 2C illustrates a block diagram of another alternative, or additional, example embodiment 280 that facilitates queue management during communication among a base station 230 and an access terminal 250, when data packets are generated in an IP node or in the access terminal 250. In an aspect, access terminal receives IP data packet(s) 290 from an IP node 282. As an example, IP node 282 can be a laptop computer; however, it should be appreciated that IP node 282 can be substantially any IP data packet node. Said IP data packet(s) 290 are generated by an application component 285 that can be remote to the access terminal 250. Said access terminal 250 comprises a queue management component 234 that operates as described above, and can convey IP data packet(s) 295 which can result from active management effected via queue management component 234, or alternatively, can include substantially all IP data packet(s) 290 received from IP node 282. It should be appreciated that application component 285, which generates the IP data packet(s) 290, can also reside in access terminal 250 and can execute an application locally, via processor 258. It should be appreciated that in example embodiment 280, active queue management is effected in an access terminal and the data packets are conveyed in a reverse link (RL).

Figure 3A:
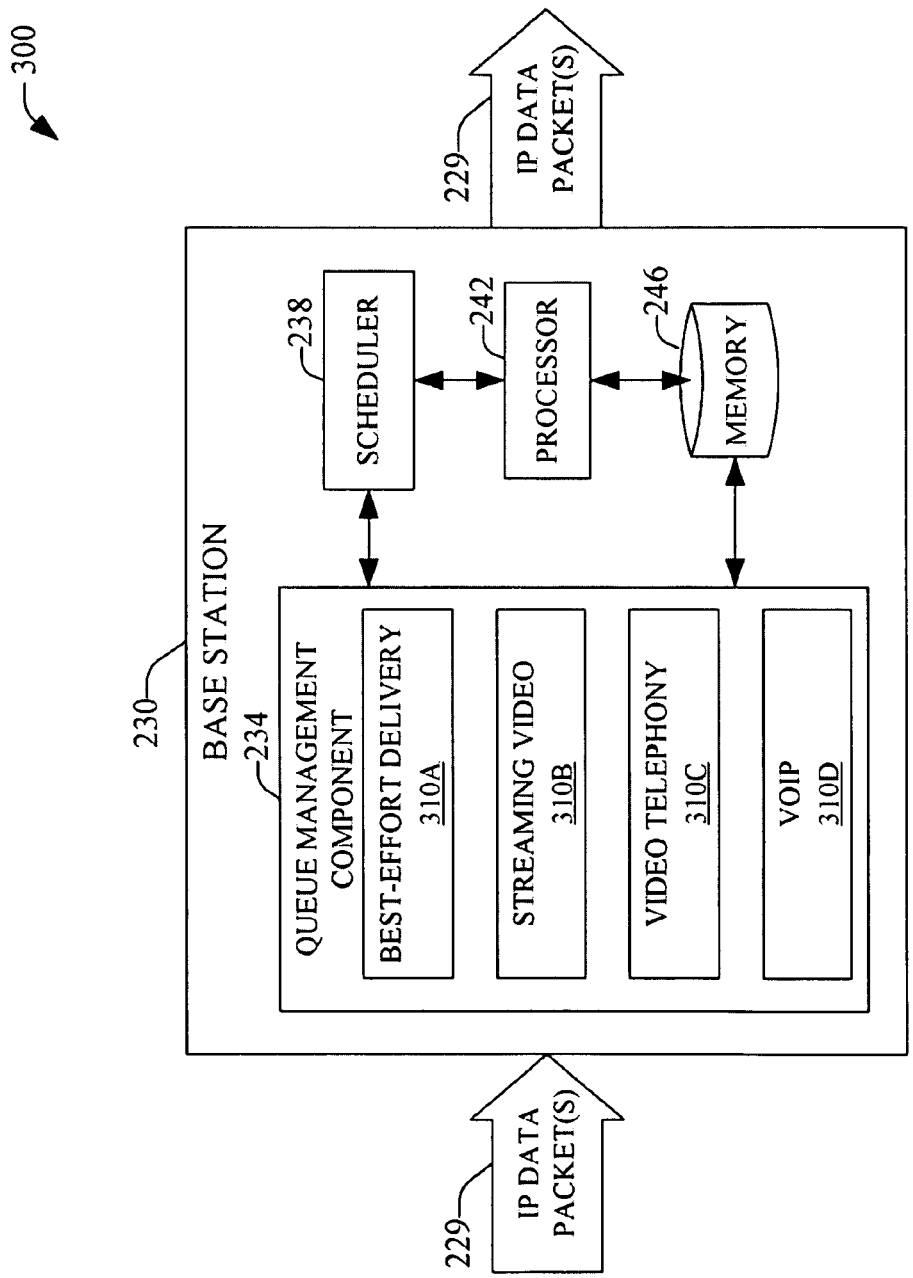
FIGS. 3A, 3B, and 3C are schematic diagrams that illustrate, respectively, a set of example application queues that can be actively managed and packet marking/dropping according to a predetermined adaptive response function, e.g., a deterministic function or, alternatively, a marking/dropping probability function; and examples of said adaptive response functions.
Figure 3B:
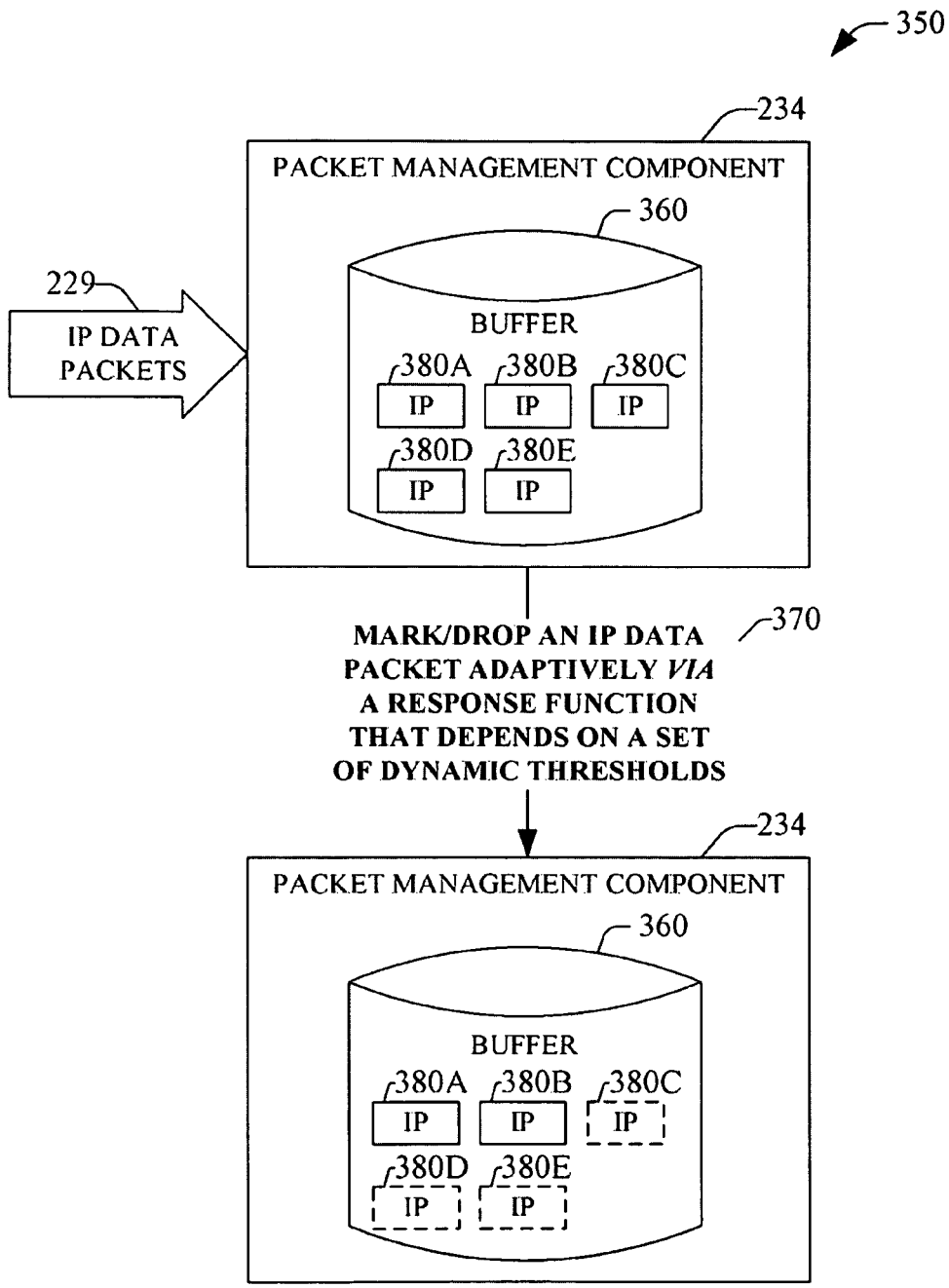
Figure 3C:
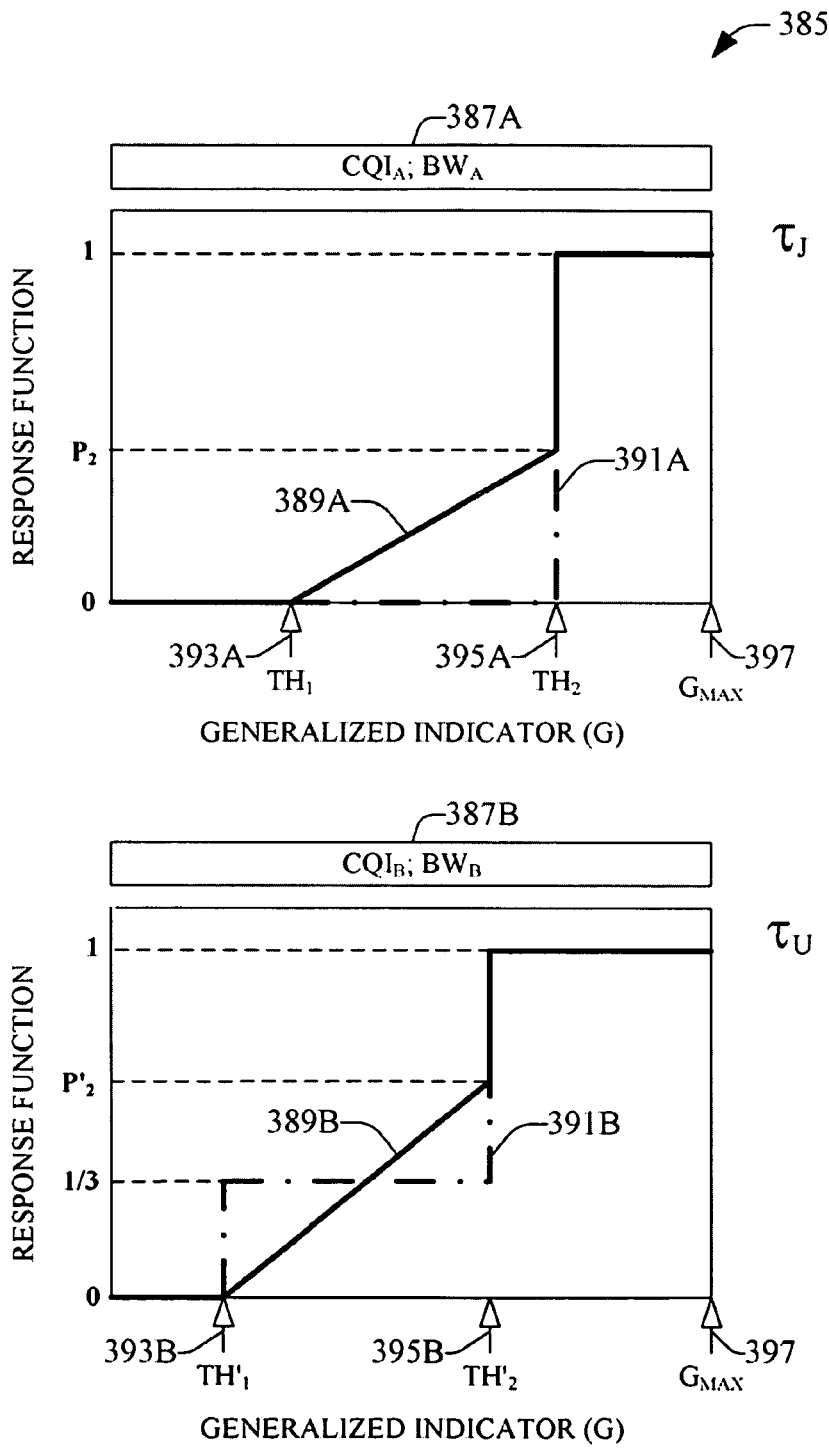

FIGS. 3A, 3B, and 3C are schematic diagrams 300, 350, and 385 that illustrate, respectively, a set of example application queues that can be managed by a queue application management component in example system 200, or example embodiment 270, described supra; packet dropping according to a predetermined adaptive response function, e.g., a deterministic function or, alternatively a marking/dropping probability function; and examples of said adaptive response functions. Diagram 300 presents four examples queues; however, it should be appreciated that additional queues can be managed by queue management component 234. In an aspect, the number of queues that are managed can depend on the amount of memory available to queue management component 234 and the number of processes and threads that processor 242 can support to, at least in part, execute the operations relevant to queue management (e.g., IP data packet filtering and buffering). Example queues presented in diagram 300 are a best-effort delivery queue 310A, a streaming video queue 310B, a video telephony queue 310C and a VOIP queue 310D. It is noted that queues 310A and 310B can be actively managed (shown with shaded blocks), whereas queues 310C and 310D may not. Typically, video telephony and VOIP applications can have tight latency requirements and can require substantially small buffers. Generally, real-time applications and associated IP data packet queues can contribute marginally to utilization of backhaul communication (e.g., link 135) during base station handoff. Thus, substantially marginal active queue management can be necessary.

In an aspect, each queue (e.g., 310A or 310B) associated with one or more applications (App) can maintain its own average size, e.g., an exponential average size—which can be represented by a buffer 360, typically embodied in a memory—and can have an associated response function (F) that is adaptive dictates whether IP data packets (e.g., IP data packet(s) 229) associated with the queue (e.g., 310A or 310B) are marked/dropped. In an aspect, the time-dependent character of a wireless link (e.g., forward link 245 and/or reverse link 269), in conjunction with the dynamic scheduling (via, for example, scheduler 238) of communication resources, confers response function F its adaptive nature. Response function F can be deterministic, wherein the IP data packets are marked/dropped based at least in part on whether a generalized indicator (see below; FIG. 3C) is above or below one or more dynamic (e.g., adaptive) thresholds.

Alternatively, or in addition, marking/dropping of packets can be stochastic, wherein F can be a marking/dropping probability function that can depend, for example, on queue size $\Sigma(App)$, and on other generalized indicators (see below) as well. In a case a generalized indicator is a queue size, it should be appreciated that multiple queue size thresholds $\{\Sigma^{(th)}(App)\}$ (not shown) can be determined, e.g., by a service provider, and can be exploited to define $P(\Sigma(App))$ and thus effect packet marking/dropping 370. As illustrated in FIG. 3B, if an incoming IP data packet (such as at least one of 380A, 380B, 380C, 380D, or 380E) in the queue is either header-compressed or it is not Explicit Congestion Notification (ECN) capable, then queue management component 234 statistically drops such IP data packet according to, for example a marking/dropping probability function $P(\Sigma(App))$. When the incoming IP data packet is ECN-capable, then packet marking can proceed by setting one or more bits (e.g., a Congestion Experienced bit) in the IP data packet's header according to probability distribution $P(\Sigma(App))$; the latter marking indicated with dashed lines in packets 380C through 380E.

FIG. 3C illustrates schematic diagrams 385 for response function F in two instants, $\tau_J$ and $\tau_U$, and for two example sets of factors that affect wireless communication among a base station (e.g., BS 230) and an access terminal (e.g., AT 250)—$\{CQI_A, BW_A\}$ 387A and $\{CQI_B, BW_B\}$ 387B. Two type of response function F are presented at instants $\tau_J$ and $\tau_{J+1}$: A stochastic F 389A and a deterministic F 391A. In the stochastic case, example response function 389A is dictated by three parameters; namely, a threshold $TH_1$ 393A, a threshold $TH_2$ 395, and a probability $P_2$ at threshold $TH_2$ 395A. In the deterministic case 391A, the response function can adopt two values: 0 and 1, with 1 corresponding to marking/dropping a packet, and 0 to incorporating a packet into a queue without marks on it. At instant u, set of communication factors 387B have changed and thus the response function can change (e.g., adapt) accordingly. Stochastic function 389B is determined by disparate thresholds $TH'_1$ 393B and $TH'_2$ 395B and a probability $P'_2$; whereas deterministic response function 391B is dictated by a fractional value (e.g., ⅓) between threshold $TH'_1$ 393B threshold $TH'_2$ 395B. In an aspect, such a fractional value can indicate the fraction of IP data packets that are deterministically marked or dropped. It should be appreciated that substantially any fractional value can be employed in a deterministic response function. Such thresholds (at substantially any instant during a communication between a base station and an access terminal) can correspond to predetermined values of a generalized indicator (G), which can include (1) an average size of a queue (e.g., 310A or 310B); (2) a queue delay; (3) an application type (e.g., a 32-bit application, or a 64-bit application, a memory intensive application or a processor intensive application, and so on); (4) a frequency reuse parameter; (5) a channel quality indicator; (6) a number of communication subcarriers; (7) an operation bandwidth; (8) a bandwidth-delay product; (9) a load level in a cell/sector served by a base station (e.g., BS 230) that communicates with an access terminal (e.g., AT 250); (10) a running history of queue sizes, or the like. In another aspect, thresholds associated with a stochastic response function can depend primarily on IP data queue size and/or packet queuing delay, whereas the slope, e.g., marking/dropping probability at said thresholds can depend on factor including channel quality indicator, operation bandwidth, frequency reuse factor, and the like.

It should be appreciated that a set of communication factors, e.g., set 387A or set 387B, typically include one or more of possible generalized indicators G. Moreover, diagrams 385 employ two threshold values for illustrative purposes and not by way of limitation; it is noted that multiple thresholds for generalized indicator G can be employed to determine a response function. The value $G_{MAX}$ 397 associated with a generalized indicator can correspond to a maximum value that can be assumed by said indicator; for instance, if the generalized indicator is a communication bandwidth, $G_{MAX}$ then corresponds to the largest operation bandwidth that a base station can utilize to communicate with an access terminal, or the largest BW that the access terminal can employ for wireless communication. It should be appreciated that while $G_{MAX}$ for some generalized indicators can be a hard upper bound (e.g., architecture of the wireless communication network, architecture of a mobile terminal, architecture of an eNode B), other maximum values can be soft and determined, for example, by a service provider.

Figure 4:
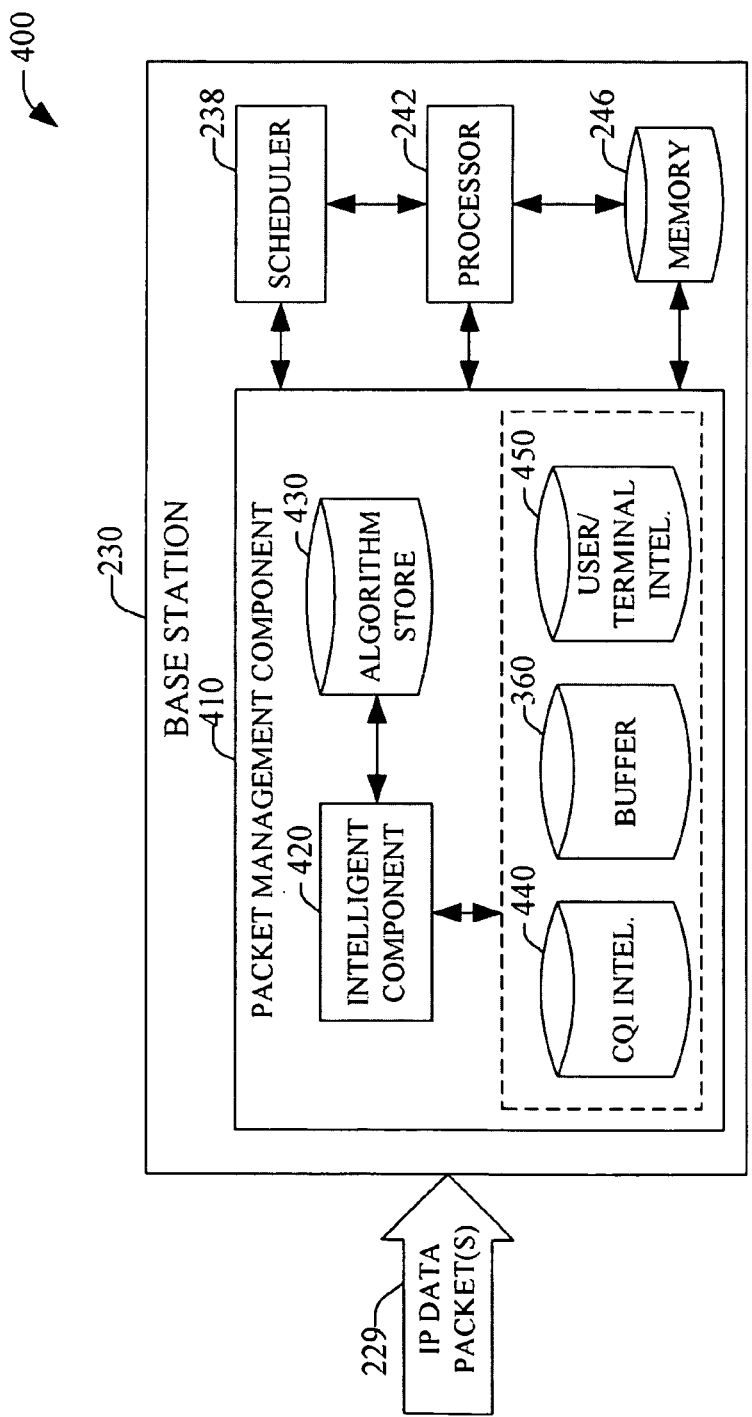
FIG. 4 is a block diagram of an example base station that comprises an example queue management component that manages incoming IP data packets according to an aspect disclosed herein.

FIG. 4 is a block diagram 400 of an example base station that comprises an example queue management component that manages incoming IP data packets based at least in part on an intelligent component. Base station 230 comprises substantially the same functional components/elements discussed above. A scheduler 248 is coupled to processor 242, in turn coupled to a memory 246. A queue management component 410 is coupled to scheduler 248, processor 242 and memory 246, and the functionality of said queue management component 410 is substantially the same as that of queue management component 234. Example components and functional elements included in queue management component 410 provide and expand said functionality; however, it should be appreciated that alternative component and functional elements can be employed to the functionality of component 410 discussed hereinafter.

Queue management component 410 manages IP data packet(s) 229 received at base station 230 through an intelligent component 420 that relies in algorithms stored in algorithm store 420 (which in an aspect can be embodied in a memory). For example, said algorithms can include at least one of a random early detection (RED) algorithm or an explicit congestion notification (ECN) algorithm. It is noted that intelligent component can optimize a set of parameters (e.g., marking/dropping probability function, a minimum threshold for queue size, a maximum threshold for queue size, and exponential average constant, or a maximum likelihood of marking/dropping when a queue is at the maximum threshold size) that enter the RED algorithm in order to obey the following targets: (i) TCP traffic queue (e.g., best-effort delivery queue 310A) aims to be non-empty at substantially all times, even after the TCP application reacts to an early congestion signal (e.g., marking indicator 248). Such target can prevent loss of over-the-air efficiency and loss of multi-user diversity—particularly critical in the multiple-user multiple-input multiple-output (MU-MIMO) operation mode of base station 230 and access terminal 250. (ii) Buffered data is minimized so that backhaul utilization is also minimized whenever BS-BS handoff occurs. It is readily apparent that targets (i) and (ii), individually tent to disparate maxima in a phase space of parameters. Furthermore said algorithms can provide for introducing response functions, e.g., marking/dropping probability functions, that depend on a size of a queue (e.g., streaming video 310B) associated with an application that conveys IP data packet(s) 229. In addition, algorithms residing in algorithm store 430 can afford marking or dropping IP data packet(s) 229 according to thresholds in a buffer (e.g., buffer 360) size when executed, at least in part, in processor 242. Furthermore, algorithms in algorithm store 430 also afford the functionalities associated with intelligent component 420 (see below) when executed, at least in part, in processor 242. In particular, intelligent component 420 can mark or drop IP data packet(s) 229 based at least in part on CQI intelligence 440 (typically embodied in a memory) or upon user/terminal intelligence 440 (typically embodied in a memory). It is noted that intelligent component 420 can rely on substantially any intelligence collected in connection with substantially any generalized indicator, such as the aforementioned example generalized indicators (1)-(10) in connection with the discussion of FIG. 3C.

In an aspect, CQI intelligence 430 can include seasonal records of CQI. In an aspect, the records can include filtered CQI values determined in the last $\Delta\tau$ seconds. In another aspect, said seasonal records can span at least one of the following example time intervals: a summer season or a winter season, a specific month, a specific time of day like rush hour (which can be important for a base station operating near a highway, wherein inter-cell interference can dramatically increase during traffic jams), or the like. Such CQI records can be associated with terminals operating in a service cell/sector covered by base station 230; and such data can be incorporated into algorithms in algorithm store 430 and employed for IP data packet(s) 229 marking or dropping. In particular the response function F, either a deterministic function or a marking/dropping probability function (P), that determines the likelihood that a packet is marked or dropped can depend explicitly on CQI, either measured on real time or stored in CQI intelligence 440, or on substantially any generalized indicator G.

It should be appreciated that since a base station, e.g., base station 230, or a sector (e.g., sector 104a) utilize IP mobility to route user data packets among base stations or sectors upon handoff, this allows a base station 230 or sector 104a to detect and determine the destination (e.g., user) of IP data packet(s) 229 being routed to an access terminals (e.g., access terminal 250). Additionally, in an aspect, IP data packet(s) are associated to a specific application, as discussed supra. Thus, intelligent component 410 can determine that a set of IP data packets are to be retained despite excessive buffer size in view of the specific characteristics of a user or terminal to which the data is transmitted. For example, a premium user employing a streaming video application can continue receiving data packets regardless the size of a buffer associated to the application. In such a scenario, users that are not premium users can experience a reduction in the flow of data, in order to maintain an overall buffer size in the base station that ensures efficient handover. In another example, an access terminal receiving critical information/data, e.g., medical records of a wounded soldier in the battlefield, conveyed by a specific application such as a database server, can retain data flow despite associate buffer size; as in the preceding example, applications that intelligent component infer that convey less critical information can experience a larger than typical number of IP data packets in order to retain an adequate buffer size for effective base station handoff. It should be appreciated that inferences associated to marking/dropping data packets associated with a specific application or user are conducted in an automated manner.

As employed hereinbefore, the term "intelligent," or "intelligence" refers to the ability to reason or draw conclusions about, e.g., infer, the current or future state of a system based on existing information about the system. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithms, and reinforced learning—to a set of available data (information) on the system. Said algorithms can be retained in an algorithm store (such as algorithm store 430), as available system information can be maintained in a memory residing in the system (such as memory 246).

In particular, to the accomplishment of the various automated aspects described above in connection with policies for load indicator generation and other automated aspects relevant to the subject innovation described herein, an AI component (e.g., component 320) can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.

In addition to intelligence in the aforementioned context of AI, intelligence can describe specific information that characterizes an entity, e.g., a user, an access terminal, or historical events identified through behaviors or conditions, or indicators associated thereof or with variables that characterize such behaviors or conditions; e.g., channel state conditions associated with the physical properties of a wireless communication channel characterized through a specific indicator like a CQI. With respect to user intelligence, information contained in such intelligence can reflect the user's personal history or behavior, and records of commercial and non-commercial activities (acquiring premium services from a service provider, or adopting edge technology embodied in novel access terminals. for example) involving a product or a service. Information on features that identify an access terminal (e.g., capable of multiple-system operation, such as UMB, LTE, and IEEE 802, bandwidth flexibility, multiple antennas, and so forth) employed by a user can be collected and retained as terminal intelligence, typically embodied in a memory.

Figure 5:
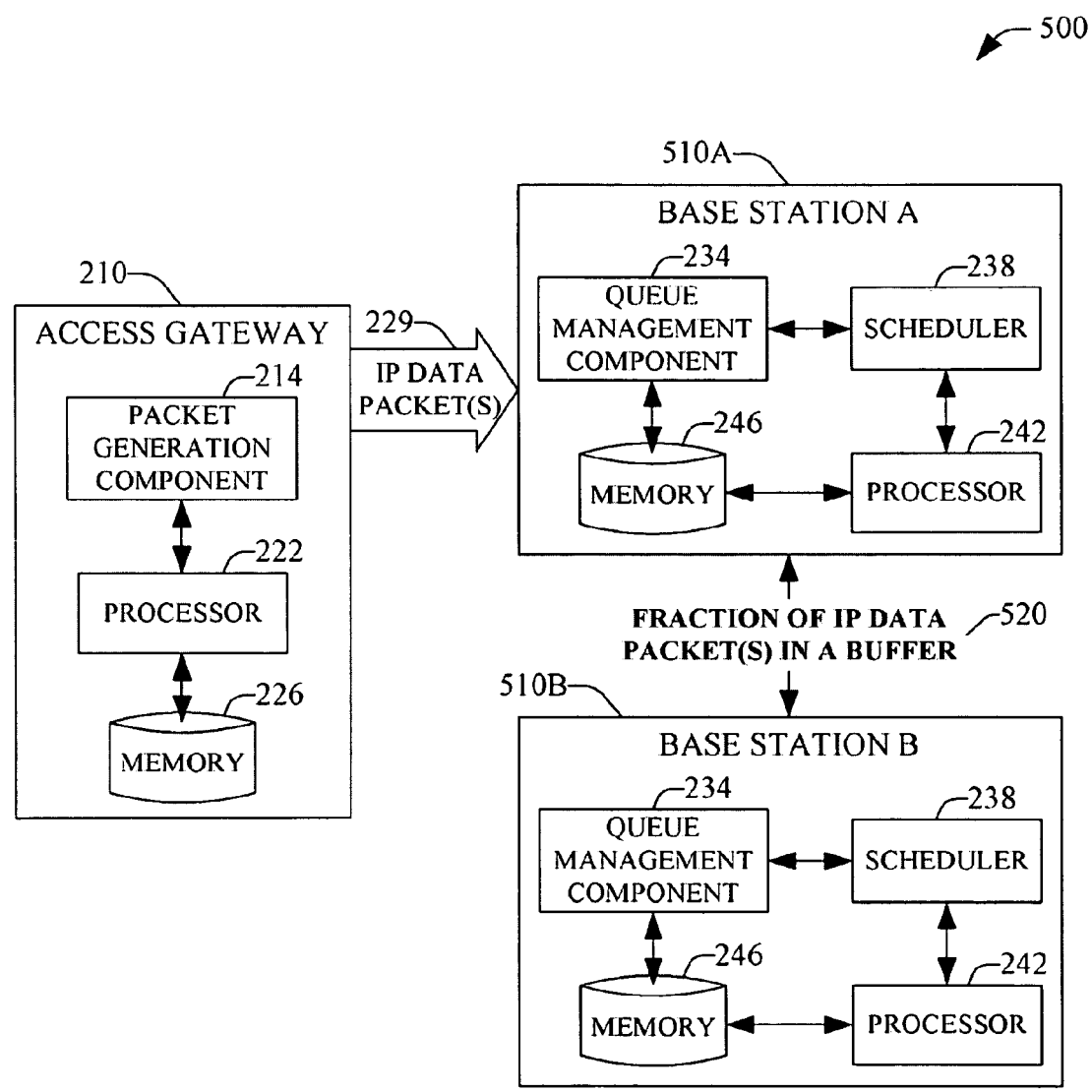
FIG. 5 is a block diagram of an example system that facilitates relaying IP data packet(s) among base stations prior to handoff.

FIG. 5 is a block diagram of an example system 500 that facilitates relaying IP data packet(s) among base stations prior to handoff. System 500 comprises two base stations 510A and 510B that include substantially the same functional component as base station 230, and operate in substantially the same manner. It should be appreciated that backhaul communication (e.g., link 135) or an idle access terminal (not shown) can be exploited to relay IP data packets 520 among base stations 5110A and 510B. Data packet relay provides at least the advantage to avoid dropping IP data packets. Data relay can originate in multiple factors: (i) Channel conditions can be poor (e.g., large intra-cell and other sector interference, temporary changes in cell/sector landscape leading to increased channel fading, and so on) and fewer terminals are scheduled such that a substantive number of IP data packet(s) 229 is to be dropped in order to keep buffer size within predetermined thresholds. (ii) A set of premium users demanding a large flow of data for critical applications. Such a situation can occur when an emergency, environmental or otherwise, takes place and critical data is transmitted from network node 210 to a relaying base station (e.g., base station 510A). (iii) An inference, via for example an intelligent module in queue management component 234 residing in base station 510A, is made as to which base station are to be involved in handoff for a specific user/terminal; depending on the application said user/terminal is employing, IP data packets can be relayed in anticipation to base station handoff among base stations 510A and 510B. Such an inference can be generated based at least in part on available user/terminal intelligence (e.g., user/terminal intelligence 450) in queue management component 234 in base station 510A.

In an aspect, unless base station handoff for a terminal involves base station 510A and 510B, relayed data reside temporarily in the base station that received the data. The time span of relayed date in a relay base station can be determined/inferred based on CQI intelligence related to the sector/cell served by the base station that conveys (or relays) the fraction of IP data packet(s) 520. For example, relayed data can reside in the relay base station (e.g., base station 510B) for a period of time spanning milliseconds to seconds and minutes.

It is noted that data relay among base stations 510A and 510B through backhaul utilization can be submitted to scheduling constraints at network node 210, or it can be scheduled by scheduler 238 in the relaying (e.g., data conveying) base station. Furthermore, IP data packet relay 520 effected through an idle access terminal can demand preservation of data integrity and fraud mitigation, as data is scheduled and routed into a third party terminal. In an aspect, relayed IP data packets 520 can be encrypted and public keys can be employed by the relay base station (e.g., base station 510B) and the third-party access terminal. In another aspect, a dedicated system code introduced by a service provider at the time of third-party terminal activation can be employed to convey relay data only through the third-party terminal.

Figure 6:
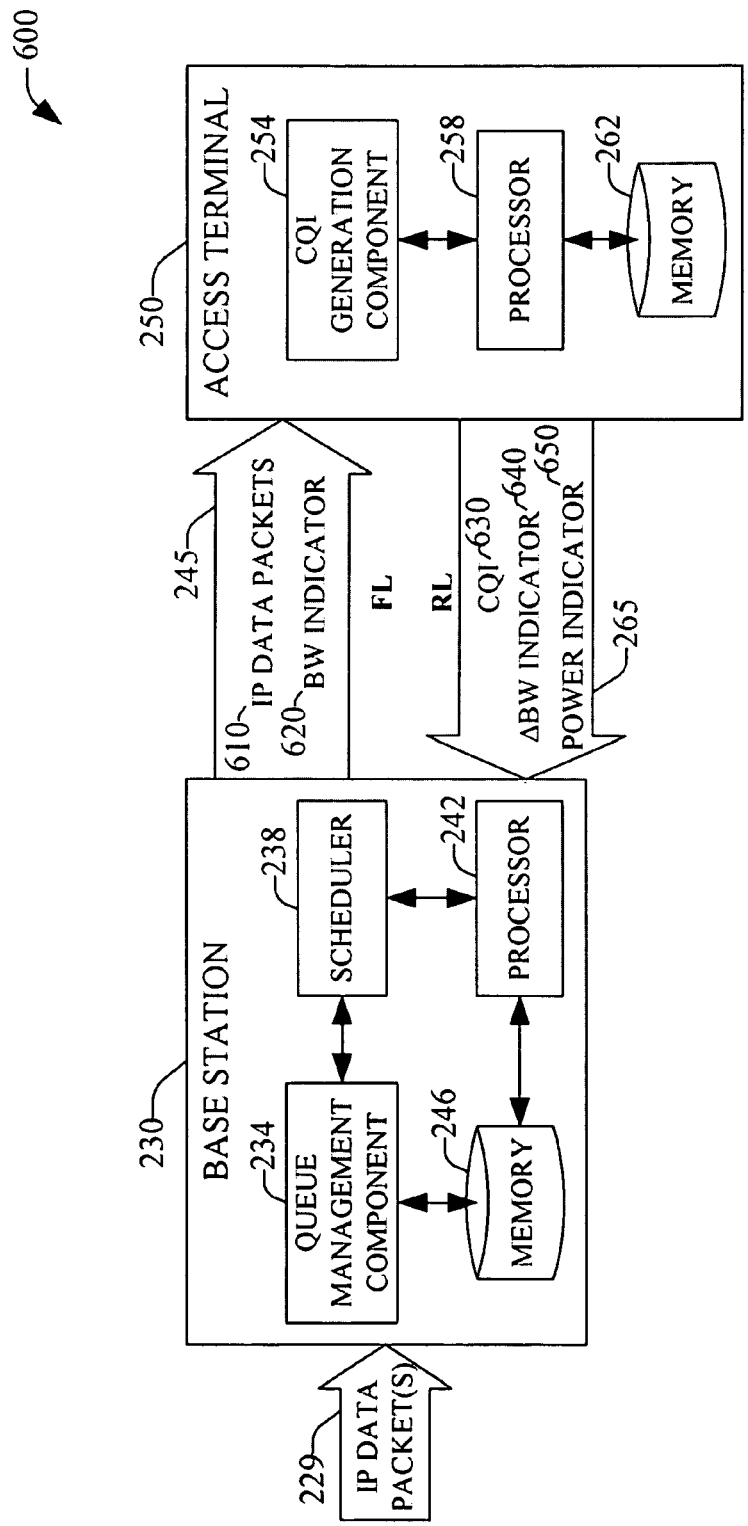
FIG. 6 illustrates a block diagram of an example system that facilitates queue management based on reconfiguration of the operation of an access terminal according to an aspect disclosed herein.

FIG. 6 illustrates a block diagram of an example system 600 that facilitates IP data packet(s) management based on reconfiguration of the operation of an access terminal that consumes the data packets. System 600 can incorporate extrinsic queue management through (re)allocation of communication resources for an access terminal 250 that receives IP data packet(s) 610. The extrinsic character of the queue management afforded by example system 600 can be reflected in the fact that buffer/queue size is controlled by reconfiguring the wireless communication link rather than, or in complement to, queue management attained through queue management component 234 in base station 234. An advantage of the extrinsic queue management is that buffer size can be optimized for the access terminal 250 that consumes the data packets and the wireless channel conditions (e.g., CQI 630) at substantially the time of base handoff. It should be appreciated that extrinsic queue management is not used to solve synchronization issues because an access terminal's traffic is buffered on a per flow basis. Base station 230 comprises a queue management component 234, a scheduler 238, a processor 242, and a memory 246; functionality of these components has been described supra. Access terminal 250 includes a CQI generation component 254, a processor 258, and a memory 262, which have been described above.

To accomplish extrinsic queue management, in an aspect, operation bandwidth BW of access terminal 250 can be adjusted to ensure that the size of a queue (not shown) associated with an application consumed by access terminal 250 is maintained at a size below at least one of a plurality of thresholds, or at a size Σ that ensures a predetermined marking/dropping probability function P(Σ(App)) of marking/dropping an IP data packet. It should be appreciated that such a size can be a tradeoff between engaging in a reconfiguration of access terminal 250, a process that can involve resynchronization, at least partially, of terminal 250. In order to adjust the bandwidth of mobile 250, a bandwidth indicator 620 is transmitted to the mobile via FL 605, for example BW indicator 620 can be transmitted as K bits (wherein K is a positive integer) in a primary control channel or secondary control channel. BW indicator 620 can convey to access terminal 250 a bandwidth that is adequate to attain a specific data rate that can lead to a predetermined size Σ(App) of a queue that is managed by base station 230. In turn, access terminal transmits to the base station, through reverse link 625, (i) a CQI 630 that indicates the channel conditions of operation, (ii) a bandwidth offset indicator 640 that indicates an adjustment to be made to the originally conveyed BW in ΔBW indicator 620, and (iii) a power indicator 650 that can ensure adequate power spectral density operation based on reconfigured BW; which depends on BW indicator 620 and ΔBW indicator 640. In an aspect, the power indicator 650 can be conveyed as Q bits (Q a positive integer) in at least one of a primary synchronization channel or a secondary synchronization channel. Upon receiving CQI 630, the bandwidth offset 640 and the power indicator 650, scheduler (re)assigns communication resources to access terminal 250 and requests queue management component 234 to drain a buffer associated with the application (not shown) utilized by access terminal 250.

Figure 7:
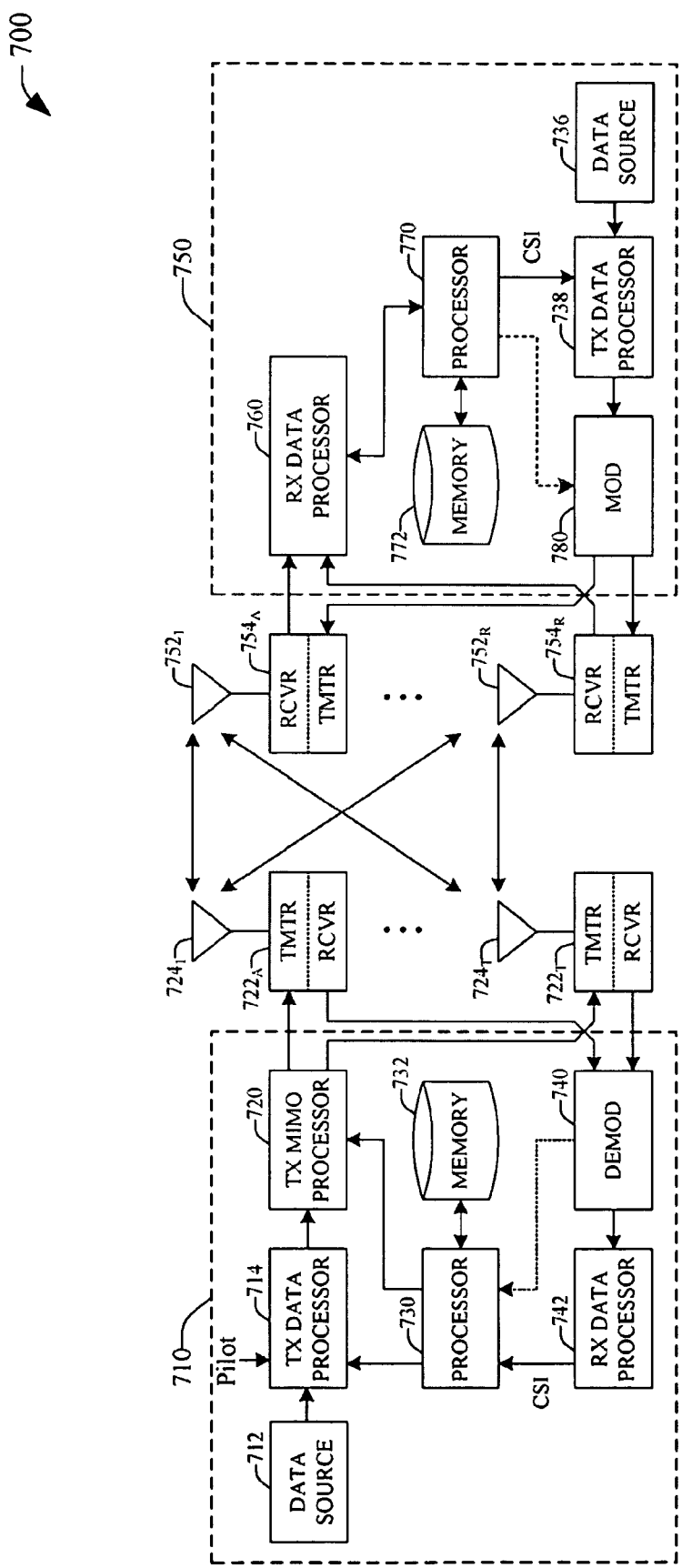
FIG. 7 is a block diagram of an example embodiment of a transmitter system and a receiver system in MIMO operation.

FIG. 7 is a block diagram 700 of an embodiment of a transmitter system 710 (such as Node B 230) and a receiver system 750 (e.g., access terminal 250) in a multiple-input multiple-output (MIMO) system that can provide for cell (or sector) communication in a wireless environment in accordance with one or more aspects set forth herein. At the transmitter system 710, traffic data for a number of data streams can be provided from a data source 712 to transmit (TX) data processor 714. In an embodiment, each data stream is transmitted over a respective transmit antenna. TX data processor 714 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 730, the instructions as well as the data may be stored in memory 732.

The modulation symbols for all data streams are then provided to a TX MIMO processor 720, which may further process the modulation symbols (e.g., OFDM). TX MIMO processor 720 then provides $N_T$ modulation symbol streams to $N_T$ transceivers (TMTR/RCVR) $722_A$ through $722_T$. In certain embodiments, TX MIMO processor 720 applies beamforming weights (or preceding) to the symbols of the data streams and to the antenna from which the symbol is being transmitted. Each transceiver 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $722_A$ through $722_T$ are then transmitted from $N_T$ antennas $724_1$ through $724_T$, respectively. At receiver system 750, the transmitted modulated signals are received by $N_R$ antennas $752_1$ through $752_R$ and the received signal from each antenna 752 is provided to a respective transceiver (RCVR/TMTR) $754_A$ through $754_R$. Each transceiver $754_1$-$754_R$ conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ transceivers $754_1$-$754_R$ based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710. A processor 770 periodically determines which pre-coding matrix to use; such a matrix can be stored in memory 772. Processor 770 formulates a reverse link message comprising a matrix index portion and a rank value portion. Memory 772 may store instructions that when executed by processor 770 result in formulating the reverse link message. The reverse link message may comprise various types of information regarding the communication link or the received data stream, or a combination thereof. As an example, such information can comprise channel quality indication(s) (such as CQI 265 or CQI 630), an offset for adjusting a scheduled resource (such as ΔBW indicator 640), and/or sounding reference signals for link (or channel) estimation. The reverse link message is then processed by a TX data processor 738, which also receives traffic data for a number of data streams from a data source 736, modulated by a modulator 780, conditioned by transceiver 754$_A$ through 754$_R$, and transmitted back to transmitter system 710.

At transmitter system 710, the modulated signals from receiver system 750 are received by antennas 724$_1$-724$_T$, conditioned by transceivers 722$_A$-722$_T$, demodulated by a demodulator 740, and processed by a RX data processor 742 to extract the reserve link message transmitted by the receiver system 750. Processor 730 then determines which pre-coding matrix to use for determining the beamforming weights and processes the extracted message.

As discussed above, in connection with FIG. 2, receiver 750 can be dynamically scheduled to operate in SIMO, SU-MIMO, and MU-MIMO. Next, communication in these modes of operation is described. It is noted that in SIMO mode a single antenna at the receiver ($N_R$=1) is employed for communication; therefore, SIMO operation can be interpreted as a special case of SU-MIMO. Single-user MIMO mode of operation corresponds to the case in which a single receiver system 750 communicates with transmitter system 710, as previously illustrated FIG. 7 and according to the operation described in connection therewith. In such a system, the $N_T$ transmitters 724$_1$-724$_T$ (also known as TX antennas) and $N_R$ receivers 752$_1$-752$_R$ (also known as RX antennas) form a MIMO matrix channel (e.g., Rayleigh channel, or Gaussian channel, with slow or fast fading) for wireless communication. As mentioned above, the SU-MIMO channel is described by a $N_R \times N_T$ matrix of random complex numbers. The rank of the channel equals the algebraic rank of the $N_R \times N_T$ matrix, which in terms of space-time, or space-frequency coding, the rank equals the number $N_V \leq \min\{N_T, N_R\}$ of independent data streams (or layers) that can be sent over the SU-MIMO channel without inflicting inter-stream interference.

In one aspect, in SU-MIMO mode, transmitted/received symbols with OFDM, at tone ω, can be modeled by:

$$y(\omega) = H(\omega)c(\omega) + n(\omega). \quad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 710, and $N_V$ can be scheduled at the discretion of the transmitter (e.g., transmitter 710, Node B 250, or access point 110) based at least in part on channel conditions (e.g., reported CQI 630) and the rank reported in a scheduling request by a terminal (e.g., receiver 650). It should be appreciated that c(ω) is the result of at least one multiplexing scheme, and at least one pre-coding (or beamforming) scheme applied by the transmitter. Additionally, c(ω) is convoluted with a power gain matrix, which determines the amount of power a scheduler 238 in base station 230 allocates to transmit each data stream $N_V$. It should be appreciated that such a power gain matrix can be a resource that is assigned to a terminal (e.g., access terminal 250), and it can be controlled through power indicator 750.

Figure 8:
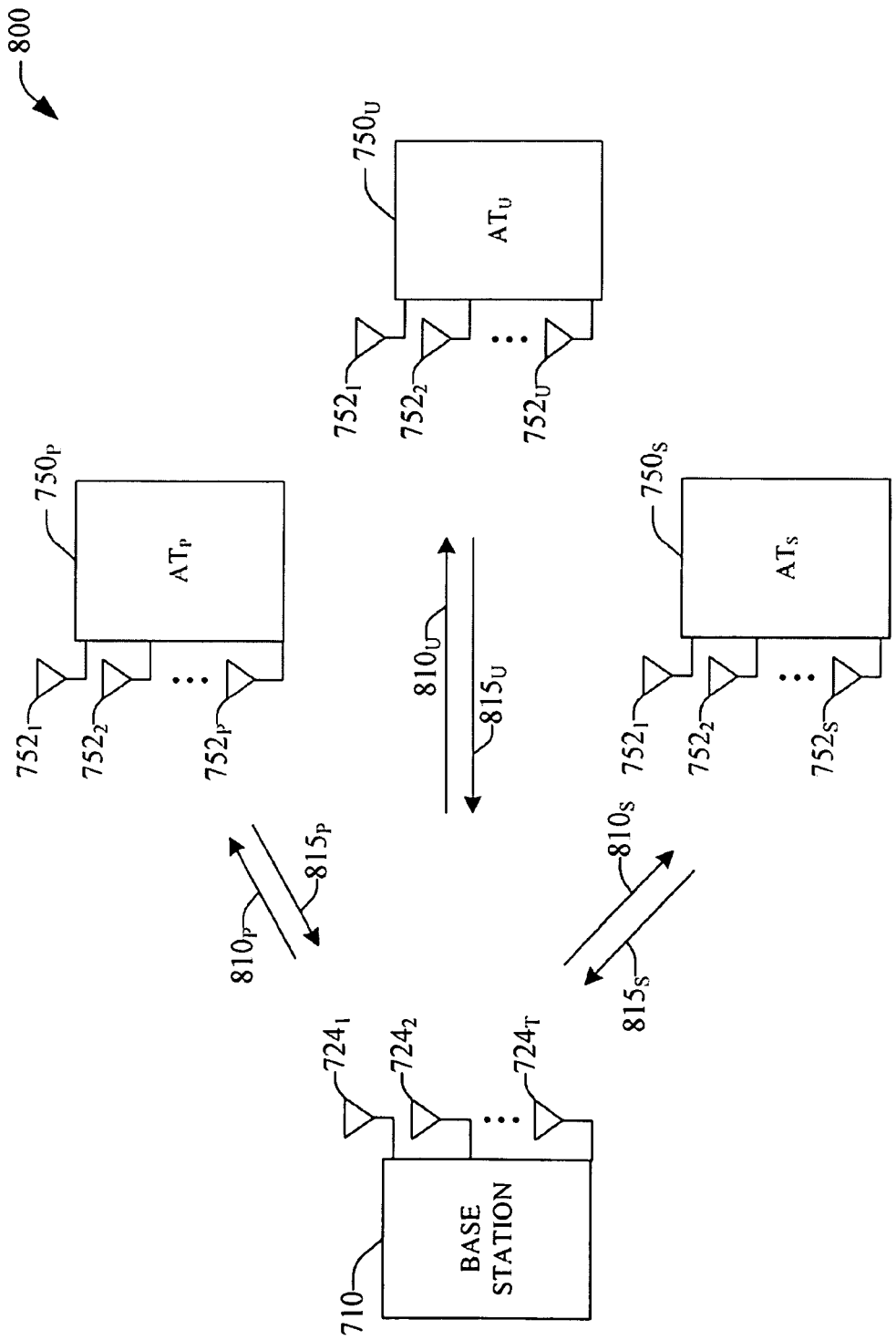
FIG. 8 illustrates a block diagram of an example MU-MIMO system.

As mentioned above, according to an aspect, MU-MIMO operation of a set of access terminals (e.g., mobile 250) is within the scope of the subject innovation. Moreover, scheduled MU-MIMO terminals operate jointly with SU-MIMO terminals and SIMO terminals. FIG. 8 illustrates an example multiple-user MIMO system 800 in which three ATs 750$_P$, 750$_U$, and 750$_S$, embodied in receivers substantially the same as receiver 750, communicate with transmitter 710, which embodies a Node B. It should be appreciated that operation of system 800 is representative of operation of substantially any group (e.g., 185) of wireless devices, such as terminal 250, scheduled in MU-MIMO operation within a service cell by a centralized scheduler residing in a serving access point (e.g., 110 or 250). As mentioned above, transmitter 710 has $N_T$ TX antennas 724$_1$-724$_T$, and each of the ATs has multiple RX antennas; namely, AT$_P$ has $N_P$ antennas 752$_1$-752$_P$, AP$_U$ has $N_U$ antennas 752$_1$-752$_U$, and AP$_S$ has $N_S$ antennas 752$_1$-752$_S$. Communication between terminals and the access point is effected through uplinks 815$_P$, 815$_U$, and 815$_S$. Similarly, downlinks 810$_P$, 810$_U$, and 810$_S$ facilitate communication between Node B 710 and terminals AT$_P$, AT$_U$, and AT$_S$, respectively. Additionally, communication between each terminal and base station is implemented in substantially the same manner, through substantially the same components, as illustrated in FIG. 7 and its corresponding description.

Terminals can be located in substantially different locations within the cell serviced by access point 710 (e.g., cell 180), therefore each user equipment 750$_P$, 750$_U$, and 750$_S$ has its own MIMO matrix channel h$_α$ and response matrix H$_α$ (α=P, U, and S), with its own rank (or, equivalently, singular value decomposition). Intra-cell interference can be present due to the plurality of users present in the cell serviced by the base station 710. Such interference can affect CQI values reported by each of terminals 750$_P$, 750$_U$, and 750$_S$. Similarly, interference also can affect feed back values of power offsets (e.g., ΔPSD 243) employed for power control at Node B 710.

Although illustrated with three terminals in FIG. 8, it should be appreciated that a MU-MIMO system can comprise any number of terminals, each of such terminals indicated below with an index k. In accordance with various aspects, each of the access terminals 750$_P$, 750$_U$, and 750$_S$ can report CQI from a single antenna and can convey a PSD offset feedback, associated with such single antenna, to Node B 710. In addition, each of such terminals can transmit to Node B 710 sounding reference signals from each antenna in the set of antennas employed for communication. Node B 710 can dynamically re-schedule each of terminals 750$_P$, 750$_U$, and 750$_S$ in a disparate mode of operation such as SU-MIMO or SIMO.

In one aspect, transmitted/received symbols with OFDM, at tone ω and for user k, can be modeled by:

$$y_k(\omega) = H_k(\omega)c_k(\omega) + H_k(\omega)\Sigma'c_m(\omega) + n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (3). The prime (') symbol indicates that transmitted symbol vector $c_k$ is excluded from the summation. The terms in the series represent reception by user k (through its channel response $H_k$) of symbols transmitted by a transmitter (e.g., access point 250) to the other users in the cell.

Figure 9:
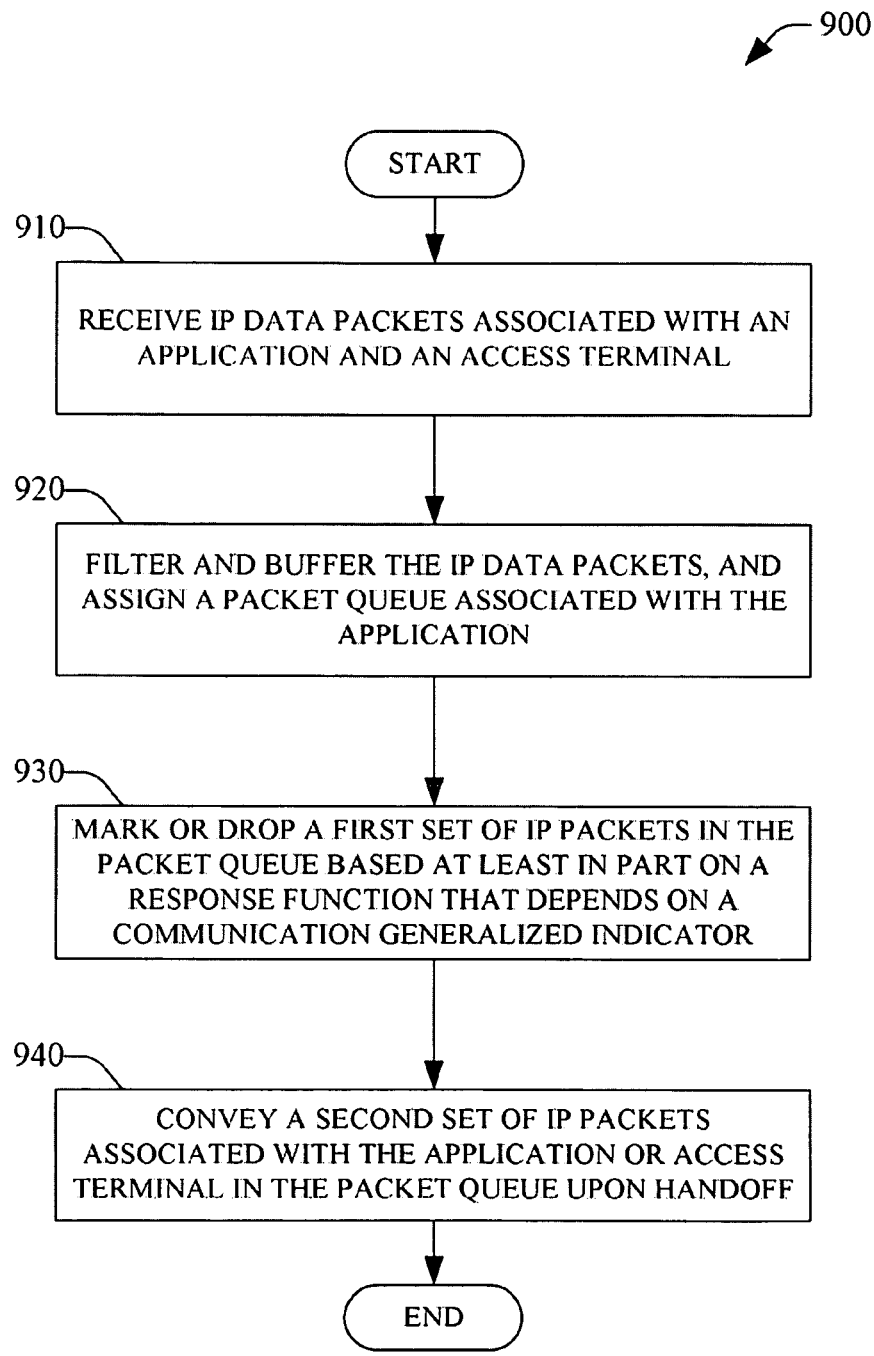
FIG. 9 presents a flowchart to a method for managing a data queue in a base station that operates in a wireless distributed network and facilitating base station handoff in accordance with an aspect.
Figure 10:
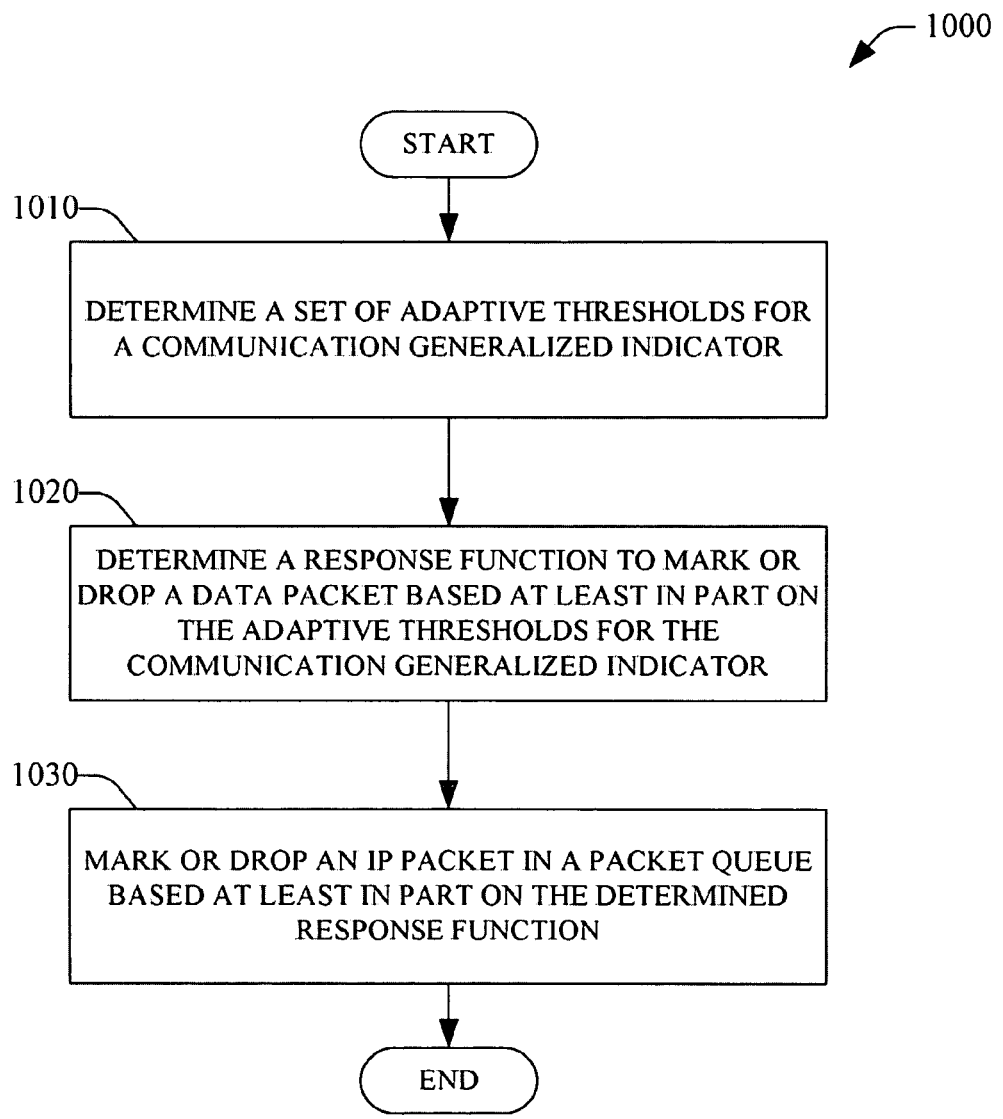
FIG. 10 presents a flowchart to a method for managing a data queue in a base station that operates in a wireless distributed network and facilitating base station handoff in accordance with an aspect.

In view of the example systems presented and described above, methodologies for inter-cell power controls that may be implemented in accordance with the disclosed subject matter will be better appreciated with reference to the flowcharts of FIGS. 9 and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 9 presents a flowchart of an example method for managing a data queue in a base station that operates in a wireless distributed network and facilitating base station handoff. At step 910 an IP data packet associated with an application and an access terminal is received. For example, IP data packet can be generated by an application that is executed remotely and can convey streamlined data or asynchronous data. For example, an application that can convey data asynchronously can be a web-based game, or a web-based browser. It should be appreciated that other applications are within the scope of the subject innovation. In an aspect, a data packet is created in a network node, through a packet generation component (FIG. 1), which can execute one or more applications; however, routing of the packet associated with the application can take place in the base station. In another aspect, the data packet can be created in an access terminal executing an application. In such a case data packets can be conveyed in a reverse link (e.g., RL) At act 920, the received IP data packets are filtered and buffered, and a packet queue is assigned to the application associated with the data packets. In one aspect, filtering and buffering can be accomplished through a queue management component (e.g., component 234) that can reside in a base station (e.g., base station 230)

At act 930 a first set of IP data packets, which can be buffered, within the packet queue associated with the application executed remotely is marked or dropped based at least in part on a response function that depends on a communication generalized indicator. The response function can be deterministic or stochastic, and the details of response function dependence on a communication generalized indicator can be determined by a service provider that facilitates wireless communication between a base station and an access terminal. A generalized communication indicator is a parameter that can characterize the wireless communication, the application that is being executed, or the queue assigned to the executed application. Examples of generalized communication indicators can include (i) an average size of a queue (e.g., 310A or 310B); (ii) a queue delay; (iii) an application type (e.g., a 32-bit application, or a 64-bit application, a memory intensive application or a processor intensive application, and so on); (iv) a frequency reuse parameter; (v) a channel quality indicator; (vi) a number of communication subcarriers; (vii) an operation bandwidth; (viii) a bandwidth-delay product; (ix) a load level in a cell/sector served by a base station (e.g., BS 230) that communicates with an access terminal (e.g., AT 250); (x) a running history of queue sizes, or the like. In the case of a deterministic response function, in one aspect, a packet is marked of dropped according to the specific value of a communication generalized indicator that is employed to monitor the application queue evolution. In another aspect, a deterministic response function can convey a rate of marking/dropping an IP data packet through a fractional value (391B; FIG. 3C). In the case of a stochastic response function is a probability distribution that provides with a probability for marking or dropping the IP data packets. In an aspect, a queue management component (FIG. 1) that can reside within the base station provides such marking/dropping.

At act 940, a second set of IP data packets associated with the application or an access terminal can be conveyed. Conveying the data packet can typically entail transmitting the data according to scheduled resources for the access terminal associated with the data packets.

FIG. 10 presents a flowchart of an example method 1000 for managing a data queue in a base station that operates in a wireless distributed network and facilitating base station handoff in accordance with an aspect. At act 1010, a set of adaptive thresholds for a communication generalized indicator is determined. Such determination can be made based on specific target for the size of an application queue, in order to ensure efficient base station handoff. Typically, such a target size represents a trade off among disparate objective functions; for instance, a first objective function can tend to maintain a large queue size in order to increase the likelihood data packets are transmitted, whereas a second objective function can tend to maintain a small queue size in order to ensure efficient base station handoff. Alternatively, or in addition, determination of thresholds can be based on intelligence collected on historical values of communication generalized indicators, as well as to optimize performance of an application or access terminal, or maintain a target level of QoS.

The determined set of thresholds is adaptive in that a threshold can change dynamically in response to the values adopted by other thresholds, such as channel state conditions, application queue size, queuing delay, communication bandwidth, bandwidth-delay product, and so on.

At act 1020 a response function is determined according to the determined set of adaptive thresholds for a communicator generalized indicator. In the case of a deterministic response function, the set of thresholds determined whether an IP data packet is marked or dropped; for instance, data packets can be dropped once a communicator generalized indicator is above a maximum threshold (FIG. 3C). Such a communication generalized indicator can be a data packet buffer size, or it can be channel quality indicator associated with a communication channel, or it can be substantially any of the aforementioned communication generalized indicators. In the case of stochastic response function, the set of adaptive thresholds can determine intervals in which the probability to mark of drop a packet can have a specific dependence on the communication generalized indicator.

At act 1030, an IP data packet in an application queue is marked or dropped based at least in part on the response function that determined response function.

Next, example systems that can enable aspects of the disclosed subjected matter are described in connection with FIGS. 11 and 12. Such systems can include functional blocks, which can be functional blocks that represent functions implemented by a processor or an electronic machine, software, or combination thereof (e.g., firmware).

Figure 11:
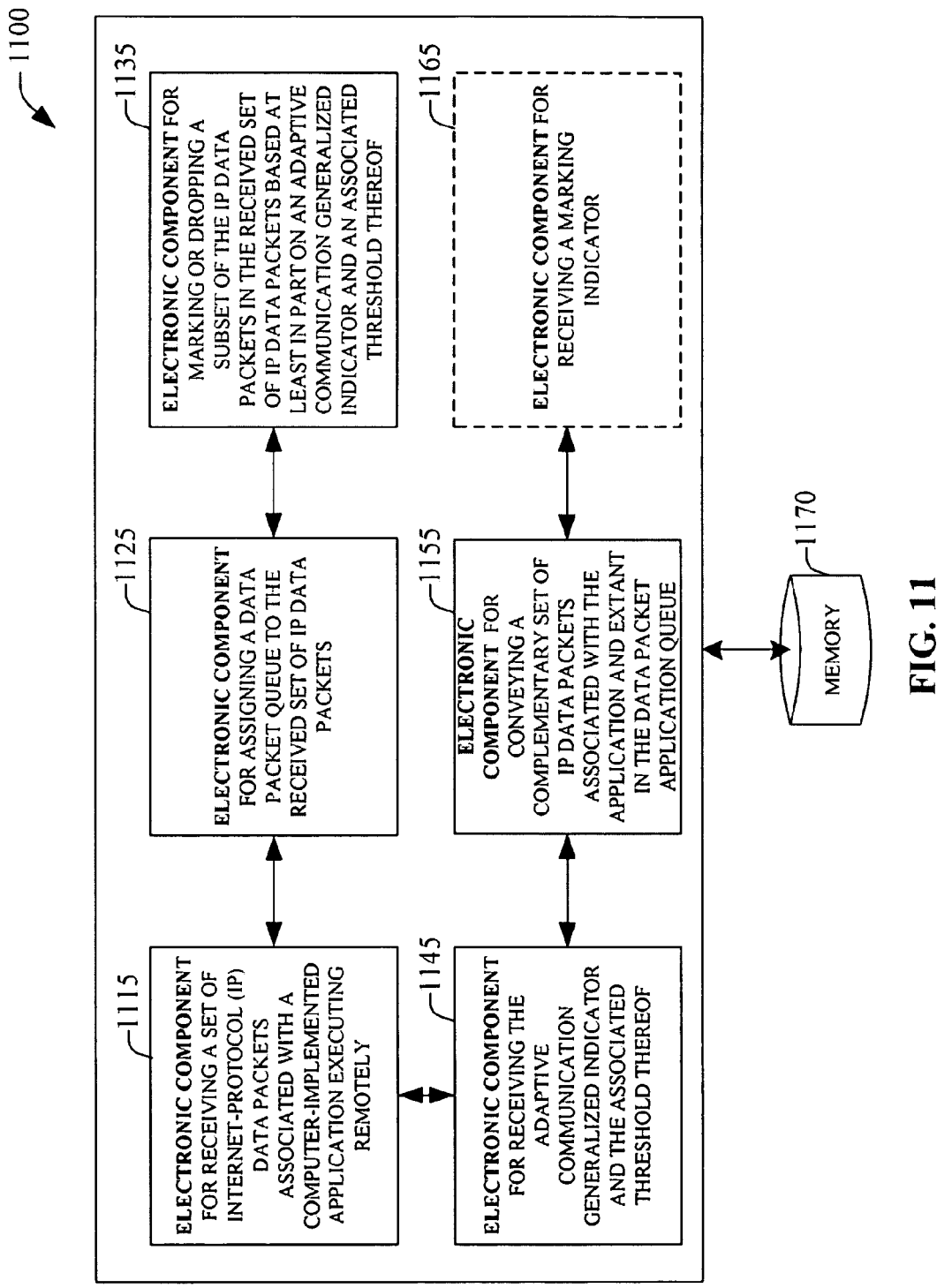
FIG. 11 illustrates a block diagram of an example system that enables managing a queue in a base station according to aspects described herein.

FIG. 11 illustrates a block diagram of an example system that enables managing a queue in a base station according to aspects described herein. System 1100 can reside, at least partially, within a base station (e.g., BS 230). System 1100 includes a logical grouping 1110 of electronic components that can act in conjunction. In an aspect, logical grouping 1110 includes an electronic component 1115 for receiving a set of internet-protocol (IP) data packets associated with a computer-implemented application executing remotely; an electronic component 1125 for assigning a data packet queue to the received set of IP data packets; an electronic component 1135 for marking or dropping a subset of the IP data packets in the received set of IP data packets based at least in part on an adaptive communication generalized indicator and an associated threshold thereof. In addition, system 1100 can include electronic component 1145 for receiving the adaptive communication generalized indicator and the associated threshold thereof, an electronic component 1155 for conveying a complementary set of IP data packets associated with the application and extant in the data packet application queue. In addition, electronic grouping 1110 can include an electronic component 1165 for receiving a marking indicator.

System 1100 can also include a memory 1180 that retains instructions for executing functions associated with electrical components 1115, 1125, 1135, 1145, 1155, and 1165, as well as measured and/or computed data that may be generated during executing such functions. While shown as being external to memory 1170, it is to be understood that one or more of electronic components 1115, 1125, 1135, 1145, 1155, and 1165 can exist within memory 1170.

Figure 12:
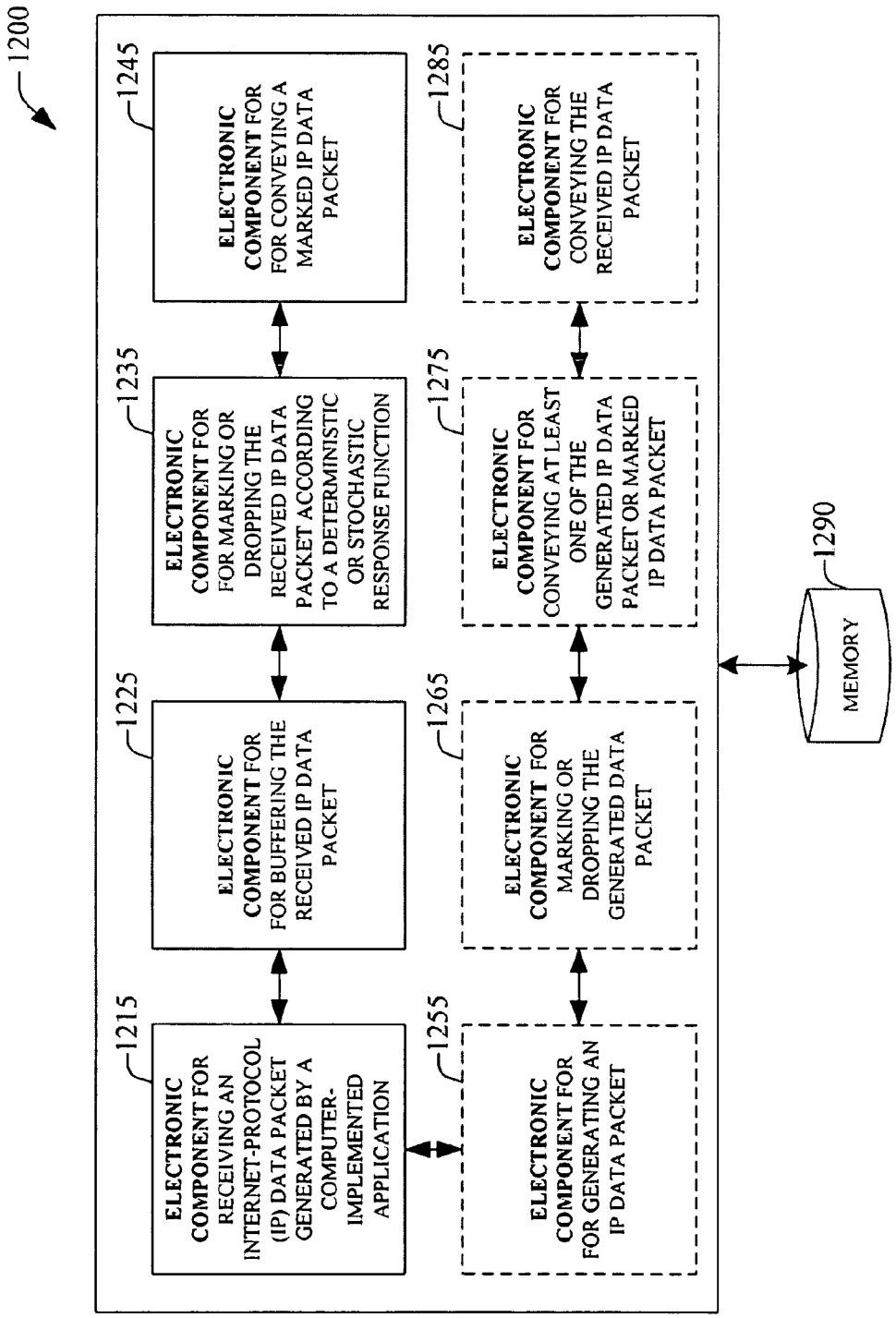
FIG. 12 illustrates a block diagram of an example system that enables managing a queue in an access terminal according to aspects described herein.

FIG. 12 illustrates a block diagram of an example system that enables managing a queue in an access terminal according to aspects described herein. System 1200 can reside, at least partially, within an access terminal (e.g., AT 250). System 1200 includes a logical grouping 1210 of electronic components that can act in conjunction. In an aspect, logical grouping 1210 includes an electronic component 1215 for receiving an internet-protocol (IP) data packet generated by a computer-implemented application; an electronic component 1225 for buffering the received IP data packet; an electronic component 1235 for marking or dropping the received IP data packet according to a deterministic or stochastic response function; and an electronic component 1245 for conveying a marked IP data packet. In addition, electronic grouping 1210 can include an electronic component 1255 for generating an IP data packet; an electronic component 1265 for marking or dropping the generated data packet; an electronic component 1275 for conveying at least one of the generated IP data packet or marked IP data packet; and an electronic component 1285 for conveying the received IP data packet.

System 1200 can also include a memory 1290 that retains instructions for executing functions associated with electrical components 1215, 1225, 1235, 1245, 1255, 1265, 1275 and 1285, as well as measured and/or computed data that may be generated during executing such functions. While shown as being external to memory 1280, it is to be understood that one or more of electronic components 1215, 1225, 1235, 1245, 1255, 1265, 1275 and 1285 can exist within memory 1290.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "has," having," or variants thereof are used in either the detailed description or the claims, such terms are intended to be inclusive in a manner similar to the term "comprising" as "comprising" is interpreted when employed as a transitional word in a claim.

The invention claimed is:

1. A base station in a wireless communications network, comprising:
a processor configured to:
receive a set of internet-protocol (IP) data packets generated by a computer-implemented application, wherein the computer implemented application executes remotely;
assign a data packet queue to the received set of IP data packets;
mark a subset of the IP data packets in the received set of IP data packets for adjusting a generation rate of the IP data packets based at least in part on a response function that depends on an adaptive communication generalized indicator; and
convey, at a reduced rate relative to a rate of the received set of IP data packets, a complementary set of IP data packets associated with the application and extant in the data packet queue, based on the marked subset of the IP data packets, to a disparate base station through backhaul network communication; and
a memory coupled to the processor.

2. The base station of claim 1, wherein the processor is further configured to receive the adaptive communication generalized indicator.

3. The base station of claim 2, wherein the adaptive communication generalized indicator is determined based at least on one of an average queue size, a running history of queue sizes, a queue delay, a channel quality indicator, an operation bandwidth, a bandwidth-delay product, a frequency reuse parameter, or a load level in a communication sector.

4. The base station of claim 3, wherein the processor is further configured to mark or drop the subset of IP data packets based at least in part on a set of adaptive thresholds for the adaptive communication generalized indicator.

5. The base station of claim 3, wherein the processor is further configured to convey the marking indicator.

6. The base station of claim 1, wherein the processor is further configured to receive a marking indicator.

7. The base station of claim 1, wherein the processor is further configured to convey the data packet queue at a time of a handoff event.

8. A base station that operates in a wireless communications system, the base station comprising:
means for receiving a set of internet-protocol (IP) data packets generated by a computer-implemented application, wherein the computer-implemented application executes remotely;
means for assigning a data packet queue to the received set of IP data packets;
means for marking a subset of the IP data packets in the received set of IP data packets for adjusting a generation rate of the IP data packets based at least in part on a response function that depends on an adaptive communication generalized indicator; and
means for conveying, at a reduced rate relative to a rate of the received set of IP data packets, a complementary set of IP data packets associated with the application and extant in the data packet queue, based on the marked subset of the IP data packets, to a disparate base station through backhaul network communication.

9. The base station of claim 8, wherein the means for conveying is further configured to convey the data packet queue at a time of a handoff event.

10. A method utilized in a wireless communication system, the method comprising:
receiving, by a base station, a set of internet-protocol (IP) data packets generated by a computer-implemented application, wherein the computer implemented application executes remotely;
assigning a data packet queue to the received set of IP data packets;
marking, by the base station, a subset of the IP data packets in the received set of IP data packets for adjusting a generation rate of the IP data packets based at least in part on a response function that depends on an adaptive communication generalized indicator; and
conveying, at a reduced rate relative to a rate of the received set of IP data packets, a complementary set of IP data packets associated with the application and extant in the data packet queue, based on the marked subset of the IP data packets, to a disparate base station through backhaul network communication.

11. The method of claim 10, further comprising receiving the adaptive communication generalized indicator.

12. The method of claim 11, wherein the adaptive communication generalized indicator determined based at least on one of an average queue size, a running history of queue sizes, a queue delay, a channel quality indicator, an operation bandwidth, a bandwidth-delay product, a frequency reuse parameter, or a load level in a communication sector.

13. The method of claim 12, wherein the response function is a stochastic function defining a first threshold and a second threshold and a marking probability as a function of the adaptive communication generalized indicator as the adaptive communication generalized indicator increases.

14. The method of claim 13, wherein the response function is a deterministic function based on at least a fractional value of a difference of the first threshold and second threshold as a function of the adaptive communication generalized indicator as the adaptive communication generalized indicator increases.

15. The method of claim 10, further comprising generating a set of IP data packets.

16. The method of claim 15, further comprising assigning a queue associated to the generated set of IP data packets.

17. The method of claim 15, further comprising conveying at least one of the IP data packets in the generated set of IP data packets.

18. The method of claim 10, further comprising:
receiving a bandwidth (BW) indicator in order to adjust the wireless communication device's operation bandwidth that facilitates reception of the IP data packet at a predetermined rate, wherein said predetermined rate ensures a specific application queue size;
generating a BW offset in response to the received BW indicator; and
generating a power indicator that conveys a power level that ensures a power spectral density is preserved when the operation BW is adjusted in response to the generated BW offset and the received BW indicator.

19. The method of claim 10, wherein the conveying further comprises conveying of the data packet queue at a time of a handoff event.

* * * * *